(12) United States Patent
Abe et al.

(10) Patent No.: US 8,159,212 B2
(45) Date of Patent: Apr. 17, 2012

(54) MAGNETIC ENCODER

(75) Inventors: Yasunori Abe, Mohka (JP); Yuji Nihei, Mohka (JP); Shinji Furuichi, Mohka (JP); Yasuko Furuichi, legal representative, Mohka (JP)

(73) Assignee: Hitachi Metals, Ltd., Tokyo (JP)

( * ) Notice: Subject to any disclaimer, the term of this patent is extended or adjusted under 35 U.S.C. 154(b) by 374 days.

(21) Appl. No.: 12/450,205

(22) PCT Filed: Feb. 21, 2008

(86) PCT No.: PCT/JP2008/052926
§ 371 (c)(1),
(2), (4) Date: Sep. 16, 2009

(87) PCT Pub. No.: WO2008/117596
PCT Pub. Date: Oct. 2, 2008

(65) Prior Publication Data
US 2010/0141242 A1 Jun. 10, 2010

(30) Foreign Application Priority Data

Mar. 28, 2007 (JP) ................. 2007-084704
Jun. 28, 2007 (JP) ................. 2007-170096
Jul. 18, 2007 (JP) ................. 2007-186843
Sep. 18, 2007 (JP) ................. 2007-241046

(51) Int. Cl.
*G01B 7/14* (2006.01)
(52) U.S. Cl. ........... 324/207.11; 324/207.21; 360/245.6; 29/603.07

(58) Field of Classification Search ............. 324/207.11, 324/207.21–207.25; 360/245.6; 29/603.07, 29/603.12
See application file for complete search history.

(56) References Cited

U.S. PATENT DOCUMENTS 5,097,209 A * 3/1992 Santos ................. 324/207.2
5,177,860 A   1/1993 Yura et al.

FOREIGN PATENT DOCUMENTS

| JP | A-57-143766 | 9/1982 |
| JP | A-63-149888 | 6/1988 |
| JP | A-4-106714 | 4/1992 |
| JP | U-4-127506 | 11/1992 |
| JP | A-7-122017 | 5/1995 |
| JP | A-2000-205808 | 7/2000 |
| JP | A-2003-344105 | 12/2003 |
| JP | A-2006-64381 | 3/2006 |

* cited by examiner

*Primary Examiner* — Arleen M Vazquez
(74) *Attorney, Agent, or Firm* — Oliff & Berridge, PLC

(57) ABSTRACT

To disclose a magnetic encoder being subjected to only small gap variation between a magnetic sensor element and a magnetic medium and readily assembled, and having a smaller number of components, high sliding resistance, and high stability against outside force, such as shock or the like. The magnetic sensor holding mechanism has a swirling spring plate structure having elasticity with respect to rotation around a rotation axis in a reciprocative slide relative movement direction, elasticity with respect to rotation around a rotation axis in a direction perpendicular to the reciprocative relative movement direction and in parallel to the magnetic medium, and elasticity in the direction perpendicular to the sensor element. A load between 50 mN and 80 mN is applied to press onto the magnetic medium.

10 Claims, 20 Drawing Sheets

MAGNETIC ENCODER

TECHNICAL FIELD

The present invention relates to a magnetic encoder for detecting, using a magnetic sensor, a magnetic field caused from a magnetic medium to obtain a displacement or a speed of a moving member.

BACKGROUND ART

There are many mechanical devices for precisely detecting a displacement and a speed of a moving member to carry out feedback control. One example of such a device may be a lens barrel for an auto-focus camera. In a lens mirror barrel, a focusing mechanism for moving the lens, using an electric motor or a supersonic motor, is provided. To detect a rotation displacement of a rotation barrel constituting the focusing mechanism, a magnetic encoder is used. Patent Document 1 discloses a magnetic encoder used in a focusing mechanism, with external appearance thereof being shown in the perspective view in FIG. 18A. A magnetic sensor 210 is pressed onto a magnetic medium 150 having a curvature and provided along the mirror barrel 255. The magnetic sensor 210 comprises a magnetic sensor element 240 and a pressure spring 220. As is obvious from FIG. 18A, the magnetic sensor element 240 is very thin in view of the size of the surface of the magnetic medium, the surface being opposed to the magnetic sensor element 240. That is, the magnetic sensor element 240 is required to be thin as the space within the mirror barrel is limited. Therefore, a magnetic encoder is used oftener than an optical encoder, which is not readily formed thin. An output of the magnetic sensor element 240 is fed back, and the mirror barrel 255 is driven for focusing, using the motor 260.

For highly accurate detection of displacement, a magnetic encoder is required to have high resolution. Resolution can be expressed in the form of a magnetic pole pitch of a magnetic medium. A magnetic pole pitch, conventionally being 30 to 50 μm, is recently required to be 10 μm to 20 μm or even smaller than 10 μm. In pursuit of higher resolution, influence of an interval, or a gap, between a magnetic medium and a magnetic sensor element becomes larger, and elimination of gap variation is accordingly required. In view of the above, advantageously, an arrangement in which the magnetic medium is placed in contact with the magnetic sensor element and slid together is often employed.

To help understanding of a positional relationship between the magnetic sensor element and the magnetic medium in this specification, vertical coordinates having the X axis in the direction in which the magnetic sensor element reciprocatively slides relative to the magnetic medium, the Y axis in the direction along the magnetic medium surface and perpendicular to the direction in which the magnetic sensor element reciprocatively slides relative to the magnetic medium, and the Z direction perpendicular to the magnetic medium surface are assumed. Further, a point (a pressure point) at which a force for pressing the magnetic sensor element onto the magnetic medium is applied is defined as the origin of the X axis, and a displacement from the X axial origin in the X direction, of a relative position between the magnetic sensor element and the magnetic medium is defined as an X offset. Still further, in order to describe relative posture of the magnetic sensor element relative to the magnetic medium surface, an angle by which the magnetic sensor element surface tilts around the X axis is defined as a pitch angle, and an angle by which the magnetic sensor element surface tilts around the Y axis is defined as a roll angle, in which the roll angle and the pitch angle with the sliding surface in parallel to the X-Y plane surface are defined as 0 degree, respectively.

FIG. 18B is a side view of a structure of a pressure spring 220 for evenly pressing the magnetic sensor element 240 onto the magnetic medium 150 when assembling in order to ensure a stable pitch angle of the magnetic sensor element 240 when sliding. The magnetic sensor element 240 is mounted in the holder 222, which can rock relative to the pressure spring 220, using the rocking central axis on the back surface of the holder 222 as a fulcrum. Through rocking, the magnetic sensor element 240 can stay closely in touch with the magnetic medium 150 via the spacer 246 even though the distance between the fixing portion of the pressure spring 220 and the magnetic medium should vary. As the magnetic sensor element 240 rocks with the rocking center in substantially parallel to the displacing direction of the magnetic medium 150, the magnetic sensor element 240 stays closely in touch with the magnetic medium 150, having the spacer 246 in-between. This enables accurate detection of an amount by which the magnetic medium 150 has moved (that is, an amount by which the focusing lenses have moved). The rocking center serves as a rocking fulcrum, i.e., a pressure point 224 where the magnetic sensor element 240 is pressed onto the magnetic medium 150. An output of the magnetic sensor element 240 is got through an FPC (Flexible Print Circuit) 244.

Patent Document 2 discloses a structure of a magnetic encoder having a single leaf spring which has a pressure function and a uniform pitch angle maintaining function. As shown in the perspective view in FIG. 19A, the leaf spring 320 holds a magnetic sensor element 340, using a sensor holding portion 322; a first arm portion 334, a connection unit 335, and a second arm portion 336 of the leaf spring 320 together support the sensor holding portion 322; and a fixing portion 326 is fixed to a mounting pedestal 360. As shown in the side view in FIG. 19B, even when the distance between the fixing portion 326 of the leaf spring 320 and the magnetic medium 150 should vary, the first arm portion 334 and the second arm portion 336 are flexed in opposite directions, whereby the pitch angle can be maintained unchanged. To respond to a request for higher accuracy, however, gap variation due to a roll angle and an X offset between the magnetic medium 150 and the magnetic sensor element 340 remain a major problem to be solved.

Patent Document 3 discloses a magnetic sensor holding structure capable of reducing gap variation due to a roll angle and an X offset of a magnetic sensor element. As shown in the perspective view in FIG. 20, Patent Document 3 proposes a very narrow magnetic sensor element 440 having a width W in the slide direction of the magnetic sensor element 440 being 0.04 to 0.3 mm, i.e., twice to fifteen times the magnetic pole pitch. Note that FIG. 20A is a perspective view showing the entire magnetic sensor 410, in which the magnetic sensor element 440 is opposed to the magnetic medium 150. FIG. 20B is a perspective view showing a structure in which the magnetic sensor element 440 is mounted on the suspension 420 at the tip end of the magnetic sensor 410; FIG. 20C is an enlarged perspective view of the magnetic sensor element 440. The width w, in the slide direction, of the magnetic sensor element 440 in contact with the magnetic medium 150 is set to as small as 0.3 mm or smaller to reduce gap variation due to an X offset and a roll angle to thereby stabilize a signal output amplitude.

Patent Document 4 discloses a magnetic sensor holding structure having a single leaf spring which has a pressure spring function and a gimbal spring function which follows pitch angle and roll angle variation. FIG. 21A is a perspective view showing external appearance of the structure. The magnetic sensor holding structure is for use in a hard disk drive (HDD), and having a quadrate swirling leaf spring 520 which comprises a slider holding portion 522 for holding a floating head slider 540, a fixing portion 526, and a swirling elastic portion 534. The swirling elastic portion 534 extends from a substantial end portion of each of the four edges of the fixing portion 526 so as to surround about three-fourths of the periphery of the slider holding portion 522 and reach the substantially middle portion of each edge thereof. To ensure a longer swirling elastic portion 534, the swirling elastic portion 534 extends from an end portion of the fixing portion 526 to the middle portion of each edge of the slider holding portion 522. With an elongated swirling elastic portion 534, elasticity in the roll direction and that in the pitch direction can be reduced, so that followability of the floating head slider 540 relative to fine convexes and concaves formed on the magnetic medium surface can be enhanced. However, as the elasticity in the roll direction and that in the pitch direction are reduced, a force (a load) for pressing the floating head slider 540 onto the magnetic medium 150 cannot be obtained. In addition, recording and reproduction while sliding the magnetic medium 150 and the floating head slider 540 is not possible in view of tracking accuracy.

Patent Document 1: Japanese Patent Laid-open Publication No. 2000-205808
Patent Document 2: Japanese Patent Laid-open Publication No. 2003-344105
Patent Document 3: Japanese Patent Laid-open Publication No. 2006-64381
Patent Document 4: Japanese Patent Laid-open Publication No. Sho 63-149888

DISCLOSURE OF INVENTION

Problem to be Solved by the Invention

When a width w in the sliding direction is set to as small as 0.3 mm or smaller, like the magnetic sensor holding structure disclosed in Patent Document 3, as shown in FIG. 20, gap variation can be suppressed even though an X offset or a roll angle should vary. However, following problems remain to be solved when mounting. That is, as the width w in the sliding direction is small, the side surface 446 of the magnetic sensor element 440 likely contacts the magnetic medium 150, and to avoid this, the side surface 446 needs to be formed as a curved surface. Here, a conventional magnetic sensor element is produced by forming an element on a wafer and then cutting the wafer on a grinder. However, formation of a side surface as a curved surface needs to be applied after processing a magnetic sensor element alone. Thus, manufacturing cost reduction can be hardly achieved.

Although Patent document 3 does not mention a specific value of the thickness h' of the magnetic sensor element 440, it can be assumed, based on the fact that an FPC is provided around the magnetic sensor element 440 and the thickness h' of the magnetic sensor element 440 needs to be thicker than that of the FPC, that the thickness h' is at least 0.5 mm or thicker. In addition, it can be estimated from FIG. 20B that the thickness h' is at least a few times the width w in the slid direction.

However, it is difficult to fix an element having a thickness h' larger than the width w on the suspension 420 so as to be vertical thereto. In addition, it is extremely difficult to fix the element such that a pressure point is located in the middle portion of the width w in the slide direction of the magnetic sensor element 440. The magnetic sensor element receives a force to be pulled in the magnetic medium moving direction with the pressure point as a fulcrum, and when the pressure point is accordingly displaced, the magnetic sensor element tends to tilt. As a result, the side surface 446 of the magnetic sensor element 440 tends to contact the magnetic medium 150 more frequently, which deteriorates abrasion resistance.

In addition, as the sliding area is reduced, a load having conventional strength for pressing the magnetic sensor onto the magnetic medium turns out to be an excessive pressing force per unit area, which also deteriorates abrasion resistance. To address the above, load reduction is required. However, with a reduced load, the magnetic sensor element 440 may tend to tilt when an external force of a shock, or the like, is applied to the magnetic encoder.

The swirling leaf spring 520, such as is disclosed in Patent Document 4, shown in FIG. 21, has both a pressure spring function and a gimbal spring function. However, when elasticity in the pitch direction and that in the rolling direction are reduced, the swirling leaf spring 520 has a defect that elasticity in the direction for pressing the magnetic sensor element onto the magnetic medium is also reduced. Therefore, there may arise a case with a flat swirling leaf spring, such as is shown in FIG. 21A, in which a sufficient load for pressing a magnetic sensor element like a magnetic encoder onto a magnetic medium to have the magnetic medium to slide cannot be obtained.

In order to obtain a required pressure load, Patent Document 4 discloses a structure, as shown in the cross sectional view in FIG. 21B, in which two swirling leaf springs 520, 520' are arranged opposed to and in contact with each other on embossed projection portions 524, 524' to thereby flex the swirling leaf springs 520, 520'. As this structure requires a larger number of members and assembling steps, the advantage achieved by employing a single swirling leaf spring having the pressure spring function and the gimbal spring function is offset. In addition, suppression of variation of the pitch angle and roll angle in the initial state requires high accuracy in assembling, which makes cost reduction difficult.

In view of the above, one of the aim of the present invention is to provide a magnetic encoder subjected to only small variation of the gap between the magnetic sensor element and the magnetic medium, and having a smaller number of components of the magnetic sensor holding mechanism, high sliding resistance, and high stability against outside force, such as shock or the like, in which the magnetic sensor element and the magnetic sensor holding mechanism can be readily assembled. The present invention also aims to provide an inexpensive magnetic encoder which can be used in a state of having just been cut off from a wafer on a grinder.

Means to Solve the Problem

A magnetic encoder according to the present invention is a magnetic encoder comprising a magnetic medium having a certain curvature and a magnetic sensor, in which the magnetic sensor has a magnetic sensor element and a magnetic sensor holding mechanism for elastically holding the magnetic sensor element so as to oppose to the magnetic medium, the magnetic sensor element having a magnetoresistive element for detecting a magnetic field caused from the magnetic medium and capable of reciprocatively sliding relative to the magnetic medium. The magnetic sensor holding mechanism includes two fixing portions each provided on each side of the magnetic sensor holding mechanism so as to be located in a single flat surface, a rectangular sensor holding portion located in a flat surface in parallel to the flat surface where the two fixing portions are provided, for holding the magnetic sensor element so as to oppose to the magnetic medium and, and elastic arms each extending from an area in the vicinity of a vertex of the rectangular sensor holding portion so as to surround about a half of the periphery of the sensor holding portion and to be connected to a respective end portion of the respective fixing portion to thereby connect therebetween, and the elastic arm of the magnetic sensor holding mechanism imparts a torsion elasticity acting around an axis in the direction in which the magnetic medium reciprocatively slides, a torsion elasticity acting around an axis in the direction perpendicular to the direction in which the magnetic medium reciprocatively slides and in parallel to the surface of the magnetic medium, and an elastic force in the direction perpendicular to the surface of the magnetic medium, to the magnetic sensor element on the sensor holding portion toward the magnetic medium, to thereby press the magnetic sensor element onto the magnetic medium.

The magnetic sensor holding mechanism has fixing portions formed on the respective sides thereof, a rectangular sensor holding portion formed at the middle thereof, and four elastic arms each extending from a vertex of the sensor holding portion so as to surround about a half of the periphery of the sensor holding portion and to reach a respective end portion of the respective fixing portion to thereby connect therebetween. Two of the four elastic arms connect one fixing portion and the sensor holding portion, and the remaining two elastic arms connect the other fixing portion and the sensor holding portion. Elastic arms extend from respective end portions of the respective opposed side edge of the two respective fixing portions in the direction substantially perpendicular to the respective side edges, then surround about a half of the periphery of the sensor holding portion, and are connected to the respective end portions (in the vicinity of a respective vertex of the rectangular sensor holding portion) of the respective side edges of the sensor holding portions. Two elastic arms extending from the respective end portions of the side edge of one of the fixing portions are connected to the respective end portions of the adjacent side edges of the sensor holding portion. The elastic arm is arranged so as to surround the external periphery of the sensor holding portion, in which the surrounding direction can be either clockwise or counterclockwise, though the surrounding directions of the respective elastic arms extending from the two respective fixing portions need to be the same.

The elastic arm is bent twice or three times by substantially ninety degrees to connect the fixing portion and the sensor holding portion, resultantly surrounding substantially a half, i.e., by substantially 180 degrees, of the external periphery of the sensor holding portion. Although this angle is not exclusive, surrounding substantially once all around the sensor holding portion is not preferable as the elasticity of the elastic arm is deteriorated and the elastic arm requires a complicated shape.

The magnetic sensor holding mechanism is fixed to the mounting pedestal via the two fixing portions with the sensor holding portion in-between. That is, the magnetic sensor holding mechanism has a structure of a spring of which both ends are supported, so that, even though the distance between the fixing portion and the magnetic medium in the Z axial direction should vary, the sensor holding portion moves up and down in the Z axial direction while maintaining in parallel to the fixing portions. With the above, the pitch angle will not vary, like with a cantilever spring in which the distance between the fixing portion and the magnetic medium in the Z axial direction varies. This can remarkably reduce gap variation. In a structure for holding the sensor holding portion, using swirling elastic arms, gap variation can be reduced with respect to pitch angle and roll angle variation. Even though an external force for causing variation in pitch angle and roll angle should be applied due to variation in position of the magnetic medium and in a mounting position of the magnetic sensor, the pitch angle and the roll angle can be maintained constant as the elastic arm deforms elastically, and therefore, gap variation can be reduced. That is, gap variation can be reduced without reducing the width (size in the X axial direction) of the magnetic sensor to remarkably small in size.

The magnetic sensor holding mechanism can be mounted in parallel or perpendicular to the moving direction of the magnetic medium. Considering that the magnetic sensor holding mechanism is fixed helps understanding. Portions to be fixed to mounting pedestals of a pair of fixing portions can be arranged so as to be parallel or perpendicular to the magnetic medium. In other words, a part of the elastic arm just extending from the fixing portion can be arranged to be parallel or perpendicular to the magnetic medium. Parallel placement and perpendicular placement require the elastic arm to have a different width and bending direction, which can be achieved with respective optimum designs.

With the width, in the slide direction, of the magnetic sensor element being equal to or larger than 1 mm, the magnetic sensor element and the magnetic sensor holding mechanism can be readily assembled. That is, with the width, in the slide direction, of the magnetic sensor element as wide as 1 mm or larger, an end portion of the magnetic sensor element can be prevented from contacting the magnetic medium. This eliminates a need for processing the magnetic sensor element so as to have a curvature. That is, a magnetic sensor element can be used in a state of having been just cut off from a wafer on a grinder. With the above, an inexpensive magnetic encoder can be obtained.

In the magnetic encoder according to the present invention, preferably, a magnetoresistive element of the magnetic sensor element is located at the substantial center of the sensor holding portion of the magnetic sensor holding mechanism.

The substantial center of the sensor holding portion serves as a load point at which to apply a load for pressing the magnetic sensor element onto the magnetic medium. With a magnetoresistive element of the magnetic sensor element placed at the load point, a difference in output of the magnetic sensor elements when the magnetic sensor element reciprocatively slides relative to the magnetic medium can be minimized.

In a magnetic encoder according to the present invention, preferably, the fixing portions, the sensor holding portion, and the elastic arms of the magnetic sensor holding mechanism are integrally made of a spring plate. Moreover, preferably, the spring plate is 50 to 200 μm thick. When the fixing portion, the sensor holding portion, and the elastic arm are made separately and assembled together through welding or using adhesive into a magnetic sensor holding mechanism, high manufacturing cost is resulted and the resultant mechanism can hardly obtain a function as a spring. The magnetic sensor holding mechanism can be made by forming a single metal plate into a desired shaped through etching or stamping press. Further, the fixing portion can be bent, using a forming machine. Although a required thickness may differ, depending on the material to use, a metal plate of 50 to 200 μm thick is preferably used when considering a required elastic force in the rolling direction, the pitch direction, and a direction in which the magnetic medium is pressed.

In the magnetic encoder according to the present invention, preferably, material of the spring plate constituting the magnetic sensor holding mechanism is non-magnetic stainless steel or bronze alloy of one of phosphor bronze, nickel silver, or brass.

In order not to disturb the magnetic field caused by the magnetic medium, preferably, the magnetic sensor holding mechanism is made of a non-magnetic member. Specifically, non-magnetic metal having spring nature adapted to chemical etching is preferred. As a press die is expensive and shape modification cannot be easily made when processing an elastic arm in a complicated shape through stamping press, material adapted to chemical etching is preferably selected. That is, non-magnetic stainless steel (Fe—Ni—Cr) or phosphor bronze (Cu—Sn—P), nickel silver (Cu—Ni—Zn), brass (Cu—Zn), which are readily processed through chemical etching and bent, are preferred. Note that nickel silver is a copper-related alloy, referred to as German silver.

In the magnetic encoder according to the present invention, preferably, an elastic force of the elastic arm of the magnetic sensor holding mechanism, acting in the direction perpendicular to the magnetic medium surface has a pressure load of 50 to 800 mN relative to the magnetic medium.

With a pressure load smaller than 50 mN, a load for pressing the magnetic sensor element onto the magnetic medium is too small, and therefore the magnetic sensor element may float from the magnetic medium surface when sliding, and an output voltage may accordingly vary. This is caused due to jump of the magnetic sensor element due to slight gurge or bump on the surface of the magnetic medium, separation thereof due to an external force, and so forth. With a load in excess of 800 mN, jump of the magnetic sensor element and separation thereof due to an external force can be suppressed, though a problem of abrasion resistance is caused. With a magnetic medium including a magnetic-coated plastic film, a larger load results in a deformed surface of the magnetic medium. With a magnetic sensor element having a smaller width, a phenomenon may be caused in which a surface of the magnetic medium is scraped near an end portion of the magnetic sensor element, as a result of which abrasion resistance is sharply deteriorated.

A load causing a deformed surface of the magnetic medium can be obtained, e.g., as follows. That is, a transparent glass place is pressed onto a surface of the magnetic medium having a curvature radium being 25 mm to obtain a load which results in a contact width being 0.5 mm between the transparent glass plate and the magnetic medium. Suppose that the surface of the magnetic medium is deformed when the contact width is 0.5 mm, and that the width of the magnetic medium is 3 mm. Further, a surface of the magnetic medium has average surface roughness Ra being about 1 μm. The plastic film of the magnetic medium is made of PET, and having 200 μm thick; the magnetic member has strontium ferrite powder with an average particle diameter thereof being 1 to 10 μm, coated thereon in 30 μm thick. A load with deformation just starting is 1136 mN (116 gf); a load per unit with a magnetic medium starting being deformed, beginning with an area in contact, is 757 mN/mm$^2$. With a margin safety in consideration, a pressure load is set to 800 mN (82 gf) or smaller, preferably to 530 mN/mm$^2$ or smaller. With a load per unit set to 530 mN/mm$^2$ or smaller, deformation of a surface of the magnetic medium due to the magnetic sensor element is not caused. This can prevent a surface of the magnetic medium from being scraped on the side edge thereof in the sliding direction of the magnetic sensor element when the width of the magnetic sensor element is smaller. In other words, for a load per unit being 530 mN/mm$^2$, the width in the sliding direction of the magnetic sensor element needs to be 0.5 mm or larger.

In the magnetic encoder according to the present invention, when the magnetic sensor element is not in contact with the magnetic medium, the sensor holding portion and the elastic arm of the magnetic sensor holding mechanism are on the same flat surface, and there is a difference in height between the flat surface of the sensor holding portion and that of the two fixing portions.

A step-like side wall is provided along each of the opposed side edges of the two fixing portions and an elastic arm is formed extending from an edge on the lower end portion of the side wall, whereby a height difference can be ensured between the flat surface of the sensor holding portion and the elastic arm and that of the fixing portion. In such a magnetic sensor holding mechanism, when the magnetic sensor element is not in contact with the magnetic medium, that is, when the magnetic sensor holding mechanism is in a free state, the sensor holding portion and the elastic arm can be set on the same flat surface. When the magnetic sensor element is pressed onto the magnetic medium, the elastic arm is caused to bend due to the force pressing the magnetic sensor element onto the magnetic medium, which causes an elastic restoring force.

Alternatively, in the magnetic encoder according to the present invention, when the magnetic sensor element is not in contact with the magnetic medium, the two fixing portions, the sensor holding portion, and the elastic arm of the magnetic sensor holding mechanism can be on the same flat surface. With the magnetic sensor element pressed onto the magnetic medium, the elastic arm is caused to bend due to the force pressing the magnetic sensor element onto the magnetic medium, which causes an elastic restoring force.

Alternatively, in the magnetic encoder according to the present invention, when there is a difference in height between the flat surface of the sensor holding portion and that of the two fixing portions with the magnetic sensor element not in contact with the magnetic medium, the height difference can be reduced when the magnetic sensor element contacts the magnetic medium.

The elastic arms extending from the opposed side edges of the two fixing portions towards the sensor holding portion are bent in advance such that the elastic arm constitutes a convex surface. The flat surface of the sensor holding portion constitutes a projected portion at the middle of the convex surface. In the thus structured magnetic sensor holding mechanism, there is caused a difference in height between the flat surface of the sensor holding portion and that of the two fixing portions with the magnetic sensor element not in contact with the magnetic medium, that is, with the magnetic sensor holding mechanism in a free state. Then, with the magnetic sensor element being pressed onto the magnetic medium, the elastic arm deforms to bend less. As a result, a difference in height between the flat surface of the sensor holding portion and that of the two fixing portions becomes smaller, which causes an elastic restoring force. The difference in height between the flat surface of the sensor holding portion and that of the two fixing portions is preferably between 0.35 mm and 5.8 mm with the magnetic sensor holding mechanism in a free state. A pressure load being 50 to 800 mN is caused when the magnetic sensor element is pressed onto the magnetic medium until the height difference is gone. With the height difference in excess of 5.8 mm in the free state, the elastic arm is twisted in the width direction thereof, which is not preferable. When the magnetic sensor element reciprocatively slides relative to the magnetic medium, it is preferable that there is no difference in height between the flat surface of the sensor holding portion and that of the two fixing portions.

In the magnetic encoder according to the present invention, preferably, each of the elastic arms has continuously changing width, changing from a portion in the vicinity of each vertex of the sensor holding portion toward both ends of the respective fixing portion.

Although the width of the elastic arm between the sensor holding portion and the fixing portion needs not to be constant, and may be partially different, continuously changing width is preferred. With a step-like discontinuous shape, stress tends to be concentrated on the changing portion, which hinders smooth function as a spring and may possibly cause breakage.

In the magnetic encoder according to the present invention, preferably, the fixing portion of the magnetic sensor holding mechanism is fixed to the two substantially U-shaped arms of the fixing portion holding member, and the fixing portion holding member is fixed to the mounting pedestal.

The fixing portion is fixed to the two arms of substantially U-shaped member of the fixing portion holding member by means of welding or using a screw or resin. The two arms of the substantially U-shaped member of the fixing portion holding member is required to have a panel thickness and panel width large enough for the arms to function as an absolute rigid body with respect to a force caused by the magnetic medium and magnetic sensor element sliding. A projected portion is provided to the bottom portion of the substantially U-shaped member, and attached to the mounting pedestal, using a screw or resin, whereby the magnetic sensor can be fixed. Using a projected portion in a different shape, the magnetic sensor holding mechanism can be fixed irrespective of the position of the mounting pedestal.

Advantage of the Invention

According to the present invention, even when the pitch angle and the roll angle should vary due to variation in position of the magnetic medium and a mounting position of the magnetic sensor, the variation can be minimized, and therefore it is possible to provide a magnetic encoder subjected to small gap variation and having high sliding resistance and stability against outside force, such as a shock or the like, in which the magnetic sensor element and the pressure spring can be readily assembled. In addition, according to the present invention, a magnetic sensor element can be used in a state of just having being cut off from a wafer on a grinder, so that an inexpensive magnetic encoder can be obtained.

DESCRIPTION OF REFERENCE NUMERALS

Figure 1:
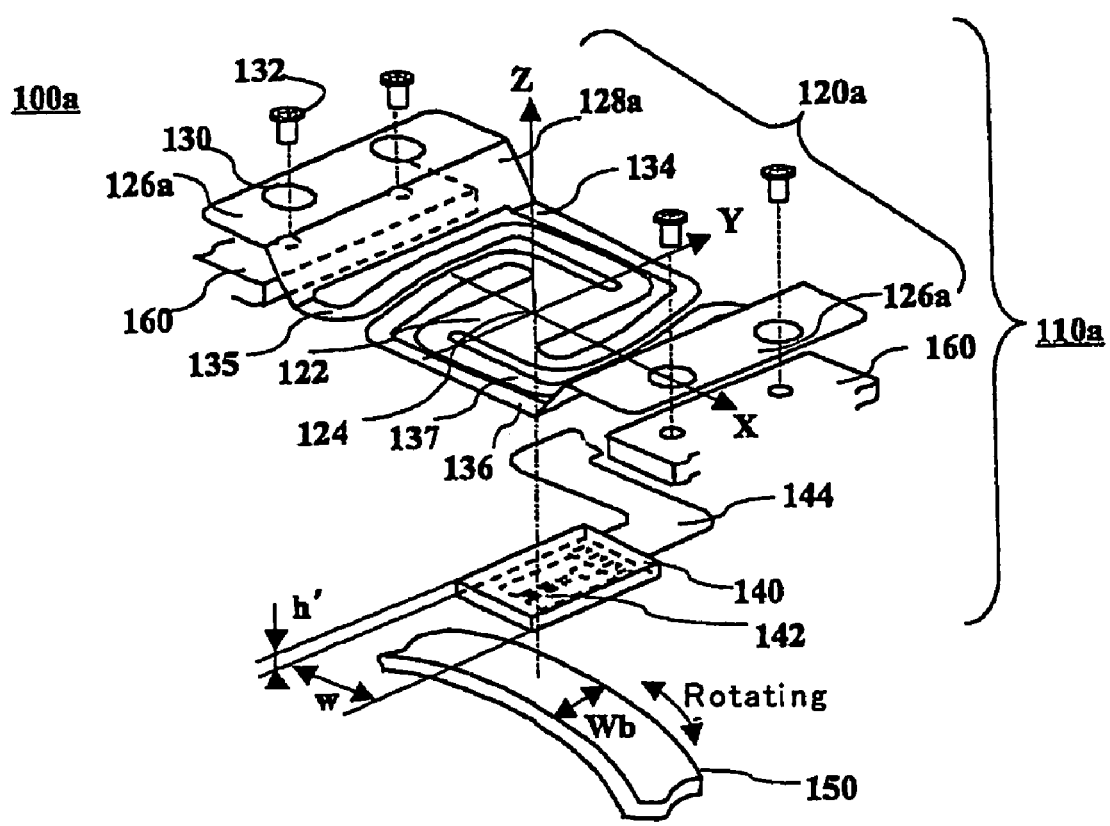
FIG. 1 is an exploded perspective view of a magnetic encoder according to a first embodiment of the present invention.

100*a*, 100*b*, 100*c*: magnetic encoder
110*a*, 110*b*, 110*c*: magnetic sensor
120*a*, 120*a*', 120*b*, 120*c*, 120*d*, 120*e*, 120*f*, 120*g*: magnetic sensor holding mechanism
122: sensor holding portion
126*a*, 126*b*, 126*c*, 126*d*, 126*e*, 126*f*: fixing portion
134, 135, 136, 137, 134', 135', 136', 137', 134*e* to 137*e*, 134*f* to 137*f*, 134*g* to 137*g*: elastic arm
140: magnetic sensor element
142: magnetoresistive element
150: magnetic medium

BEST MODE FOR CARRYING OUT THE INVENTION

In the following, embodiments of the present invention will be described, with reference to the accompanying drawings.

First Embodiment

FIG. 1 is an exploded perspective view of a magnetic encoder 100a according to a first embodiment of the present invention. A magnetic sensor 110a, of the magnetic encoder 100a, has a magnetic sensor holding mechanism 120a and a magnetic sensor element 140 fixed by means of resin (not shown) on the rear surface of a rectangular sensor holding portion 122 and having a magnetoresistive element 142. The magnetic sensor element 140 is placed at the substantial center of the rectangular sensor holding portion 122, and a pressure point 124 of the magnetic sensor holding mechanism 120a is located at the substantial center of the sensor holding portion 122, so that the magnetic sensor element 140 is pressed from directly thereabove. The magnetic sensor holding mechanism 120a is fixed to the mounting pedestal 160, using a screw 132 inserted in a hole 130 formed on the fixing portion 126a. The magnetic, sensor element 140 is pressed onto the magnetic medium 150 with a predetermined load. An FPC 144 is used in order to extract to the outside an electric signal of the magnetic sensor element from the magnetic sensor element 140.

The magnetic sensor holding mechanism 120a is integrally made of a non-magnetic stainless steel (SUS 304) spring plate of 75 μm thick through chemical etching and using a bending device. The magnetic sensor element 140 has a magnetoresistive element 142 and a wire, both being formed on a glass wafer of 1.1 mm thick, using photolithography technique, vacuum film formation technique, and etching technique. An alumina film of about 3 μm thick is formed on the magnetoresistive element 142. A glass wafer having a magnetoresistive element formed thereon is cut into pieces each having a width w of 2.0 mm and a length of 4.1 mm, using a diamond grinder, whereby a magnetic sensor element 140 is obtained. The thickness of the glass wafer is instantly the thickness h' of the magnetic sensor element, while ignoring the thickness of the alumina film and the magnetoresistive element and the wire which are only about a few μm. The alumina film on the magnetoresistive element 142 provides a gap between the magnetoresistive element 142 and the magnetic medium 150. The wire of the magnetic sensor element 140 is attached to the FPC 144 by means of lead-free solder.

A magnetic-coated plastic film tape is adhesively fixed on a non-magnetic surface having a certain curvature, whereby a magnetic medium 150 is formed. The width Wb of the magnetic medium 150 is 3 mm and the curvature radius of the magnetic medium surface is 27.5 mm. For convenience in description, Cartesian coordinates, such as is shown in FIG. 1, having the X axis in the direction in which the magnetic sensor element 140 slides relative to the magnetic medium 150, the Y axis in the width direction of the magnetic medium 150, and the Z axis perpendicular to the magnetic medium surface are assumed.

Figure 2A:
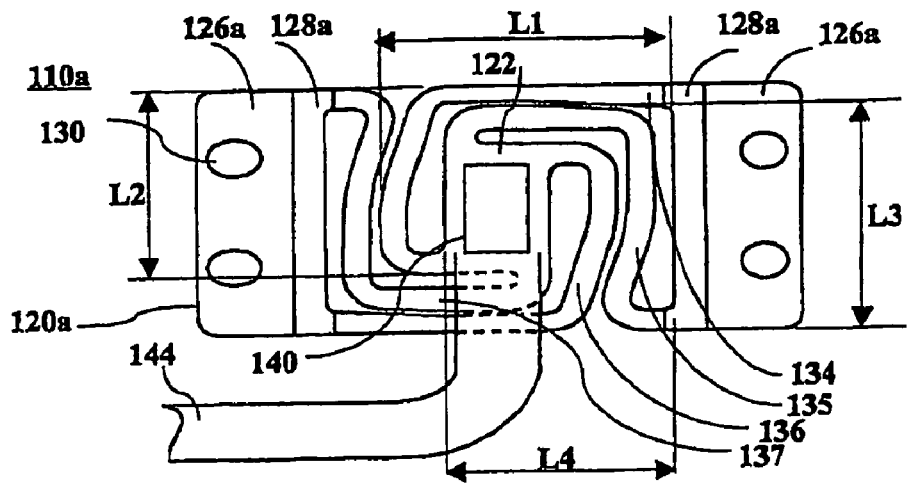
FIG. 2 is a diagram showing a magnetic sensor used in the first embodiment of the present invention, with FIG. 2A being a plan view thereof and FIGS. 2B and 2C being side views thereof.
Figure 2B:
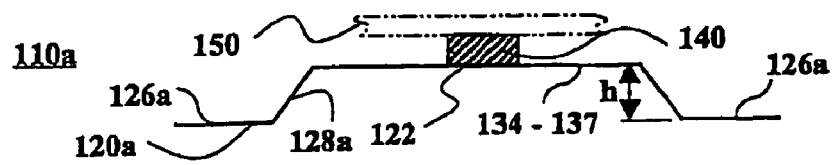
Figure 2C:
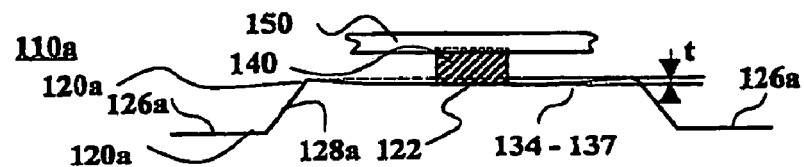

FIG. 2A is a plan view of the magnetic sensor 110a according to this embodiment, viewed from the side of the magnetic medium (the rear surface side); FIGS. 2B and 2C are side views of the same. The magnetic sensor holding mechanism 120a comprises a sensor holding portion 122 for holding the magnetic sensor element 140, four elastic arms 134, 135, 136, 137, and two fixing portions 126a. Further, a stepped side wall 128a is formed extending from each of the opposed side edges of the two fixing portions 126a. The elastic arms 134 to 137 extend from the side edges of the side walls 128a and are connected to the sensor holding portion 122.

FIG. 2B is a side view of the magnetic sensor element 140 not in contact with the magnetic medium 150, in which the sensor holding portion 122 and the elastic arms 134 to 137 of the magnetic sensor holding mechanism 120a are on the same flat surface. A height difference h is ensured between the flat surface of the sensor holding portion 122 and the elastic arms 134 to 137 and the flat surface of the fixing portion 126a. The height difference h ensures a space in which the fixing portion 126a is fixed to the mounting pedestal 160. The side walls 128a are bent along the respective side edges of the fixing portion 126a, and the elastic arms 134 to 137 are bent along the respective side edges of the side walls 128a, whereby a height difference h is ensured. The four elastic arms 134 to 137 are connected to the respective end portions of the respective edges of the sensor holding portion 122 and swirling around a half of the periphery of the sensor holding portion with the center of the sensor holding portion 122 as a swirling center and
to be connected to the respective end portions of the side walls 128a formed along the side edges of the respective fixing portions 126a. The elastic arms 134 and 136, 135 and 137 are formed point symmetrical with respect to the center of the sensor holding portion. In an example, the thickness of the magnetic sensor holding mechanism 120a is 75 μm, and the winding sizes L1, L2, L3, L4 of the elastic arms are 8.25 mm, 6.85 mm, 8.25 mm, 6.40 mm, respectively. The width of the elastic arm is partially modified to be set to 0.75 mm in order to reduce stress concentration. In the example, the resultant spring characteristic is such that pitch elasticity related to elastic deformation around the X axis is 26.8 mN·mm/degree, roll elasticity related to elastic deformation around the Y axis is 32.2 mN·mm/degree, and spring elasticity in the Z axis direction is 137.2 mN mm/degree. FIG. 2C shows the magnetic sensor element 140 pressed onto the magnetic medium 150 to thereby deform the elastic arms 134 to 137 by a deform amount t.

Second Embodiment

Figure 3:
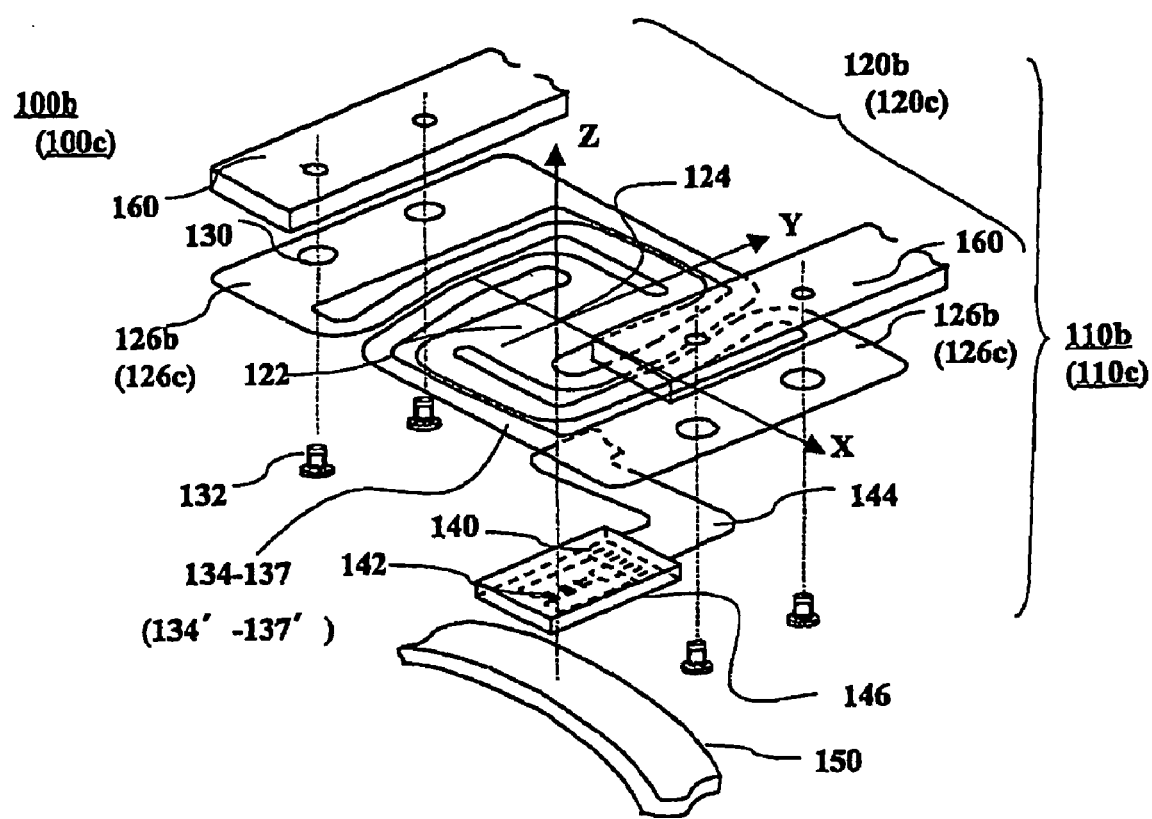
FIG. 3 is an exploded perspective view of a magnetic encoder according to a second embodiment of the present invention.

FIG. 3 is an exploded perspective view of a magnetic encoder 100b according to a second embodiment of the present invention. In the second embodiment, magnetic sensor 110b, of the magnetic encoder 100b, has a magnetic sensor holding mechanism 120b and a magnetic sensor element 140 fixed by means of resin (not shown) on the rear surface of a rectangular sensor holding portion 122 and having a magnetoresistive element 142. As the magnetic sensor 110b differs from the magnetic sensor 110a in the first embodiment in structure of the magnetic sensor holding mechanism, the magnetic sensor holding mechanism 120b will be described.

The two fixing portions 126b, the elastic arms 134 to 137, and the sensor holding portion 122 of the magnetic sensor holding mechanism 120b are on a substantially identical flat surface. The magnetic sensor element 140 is located at the substantial center of the sensor holding portion 122, and the pressure point 124 of the magnetic sensor holding mechanism 120b is located at a substantial center of the sensor holding portion 122, so that the magnetic sensor element 140 is pressed from directly thereabove. The magnetic sensor holding mechanism 120b is fixed to the mounting pedestal 160, using a screw 132 inserted in a hole 130 formed on the fixing portion 126b. The screw 132 is inserted from the side of the magnetic medium 150. The magnetic sensor element 140 is pressed onto the magnetic medium 150 with a predetermined load. An FPC 144 is used in order to extract to the outside an electric signal of the magnetic sensor element from the magnetic sensor element 140. For this magnetic encoder as well, Cartesian coordinates, similar to that which is shown in FIG. 1, are assumed, as shown in FIG. 3, for convenience in description.

Figure 4A:
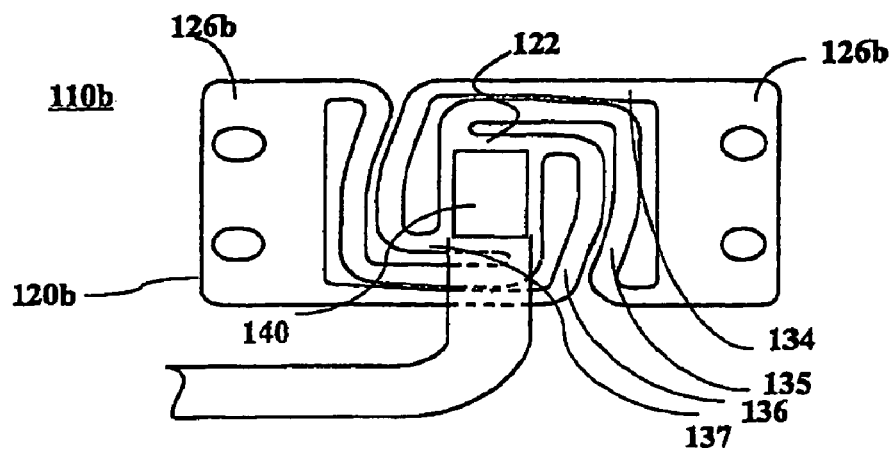
FIG. 4 is a diagram showing a magnetic sensor used in the second embodiment of the present invention, with FIG. 4A being a plan view thereof and FIGS. 4B and 4C being side views thereof.
Figure 4B:
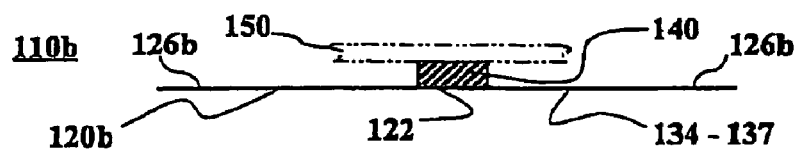
Figure 4C:
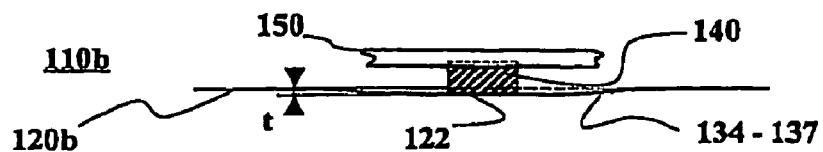

FIG. 4A is a plan view of the magnetic sensor 110b according to this embodiment viewed from the side of the magnetic medium; FIGS. 4B and 4C are side views of the same. The magnetic sensor holding mechanism 120b comprises a sensor holding portion 122 for holding the magnetic sensor element 140, four elastic arms 134, 135, 136, 137, and two fixing portions 126b. Four elastic arms 134 to 137 extend from the respective end portions of the respective edges of the sensor holding portion 122 (a vertex of the rectangular sensor holding portion 122) so as to swirl about a half of the periphery of the sensor holding portion with the center of the sensor holding portion 22 as a swirling center and to be connected to the respective end portions of the respective opposed side edges of the fixing portions 126b. When the magnetic sensor element 140 is not in contact with the magnetic medium 150, as shown in the side view of FIG. 4B, two fixing portions 126b, the elastic arms 134 to 137, and the sensor holding portion 122 of the magnetic sensor holding mechanism 120b are on the substantially identical flat surface.

FIG. 4C shows the magnetic sensor element 140 being pressed onto the magnetic medium 150 to thereby deform the elastic arms 134 to 137 by a deform amount t. The elastic arms 134 to 137 and the sensor holding portion 122 used in this embodiment are made of material and has a structure identical to that in the first embodiment, and therefore have identical spring characteristic to that in the first embodiment. Therefore, the elastic arms 134 to 137 are flexed, as shown in FIG. 4C, thereby causing an elastic restoring force, similar to the first embodiment.

Figure 5:
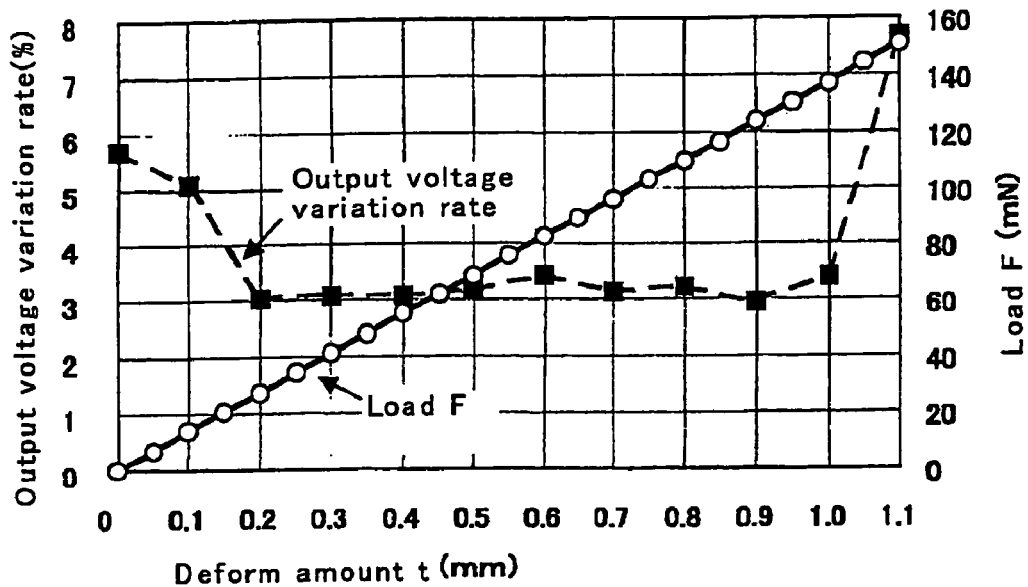
FIG. 5 is a graph showing an output voltage variation rate (%) and a load F with respect to a deform amount t of a magnetic sensor holding mechanism in the magnetic encoder according to the second embodiment of the present invention.

FIG. 5 is a graph showing a pressure (load) F and an output voltage variation rate (%) of a magnetic sensor element 140 when the magnetic sensor element 140 reciprocatively slides relative to the magnetic medium 150, with respect to a deform amount t of the magnetic sensor holding mechanism 120b in the magnetic encoder 100b according to the second embodiment. While the magnetic sensor element 140 is pressed onto the magnetic medium 150 to thereby move in the Z axial direction, the deform amount t with the magnetic sensor element 140 having been just brought into contact with the magnetic medium 150 is defined as zero; and a distance by which the magnetic sensor holding mechanism 120b is deformed as being further pressed by the magnetic sensor element 140 is defined as a deform amount t. The deform amount t can be vary between 0 mm and 1.1 mm, the latter being the thickness of the magnetic sensor element. A rate of a difference between the maximum and minimum of an output voltage when the magnetic sensor element 140 reciprocatively moves on the magnetic medium 150 from one to the other end of the length of the magnetic medium 150, with respect to the average of the output voltages is defined as an output voltage variation rate (%).

With the deform amount t between 0 mm and 0.2 mm, and a load F is of 30 mN or smaller, which is insufficient to stabilize the gap between the magnetic sensor element and the magnetic medium, and under such condition, the magnetic encoder cannot attain required accurate detection of displacement because the output voltage variation rate (%) is large. With the deform amount t being 0.2 mm or larger, a lower output voltage variation rate (%) is resulted. However, as allowance is taken into consideration, a deform amount t being 0.4 mm or larger (a load being 50 mN or larger) is preferable.

Note that a larger output voltage variation rate (%) is resulted with respect to the deform amount t being 1.1 mm or larger. This is considered because a part of the elastic arm starts contacting the magnetic medium 150. With expectation that deformation of the elastic arm may vary during reciprocative sliding, preferably, the deform amount t is set to between 0.6 mm and 0.9 mm. With the deform amount t between 0.6 mm and 0.9 mm, a load F between 80 mN and 120 mN is resulted. That is, a load within a required range between 50 mN to 800 mN can be achieved. In addition, a small stable output voltage variation rate, namely, about 3%, can be obtained as well.

Figure 6:
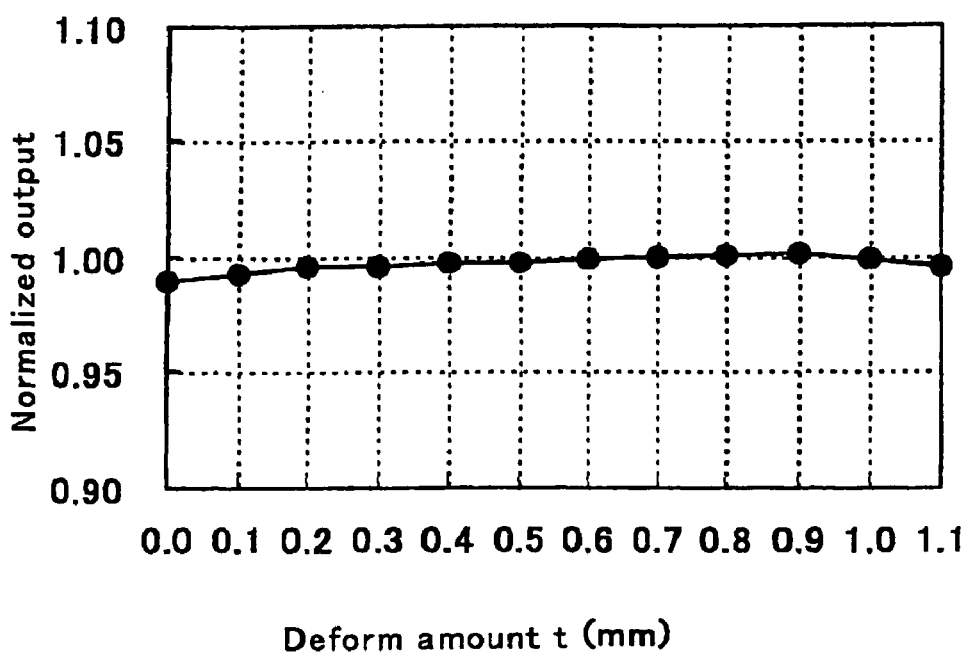
FIG. 6 is a graph showing a normalized output with respect to a deform amount t of the magnetic sensor holding mechanism in the magnetic encoder according to the second embodiment of the present invention.

FIG. 6 is a graph showing a relationship between a deform amount t of the magnetic sensor holding mechanism 120b and an output voltage of the magnetic sensor element 140. An output voltage of the magnetic sensor element is expressed in the form of a normalized output which is defined such that an output voltage being one is output with respect to a deform amount t being 0.7 mm. According to the graph in FIG. 5, a substantially constant output voltage (a normalized output) is obtained with respect to the deform amount t between 0.2 mm and 1.0 mm, with respect to which an output voltage output voltage variation rate (%) is stabilized. This is considered because change of the deform amount t causes only small variation of the pitch angle, thus rarely affecting the output voltage. In other words, a larger tolerance range can be set for the deform amount t, which makes it possible to achieve improved assembly efficiency and reduced component cost.

Third Embodiment

In the following, tolerance for the distance (a gap) between the magnetic sensor element and the magnetic medium is obtained by a magnetic encoder according to an embodiment of the present invention; influence of the pitch angle and roll angle of the magnetic sensor element on the gap is determined; and whether or not it is possible to keep the gap within the tolerance with a possible pitch angle and roll angle is determined.

Figure 7:
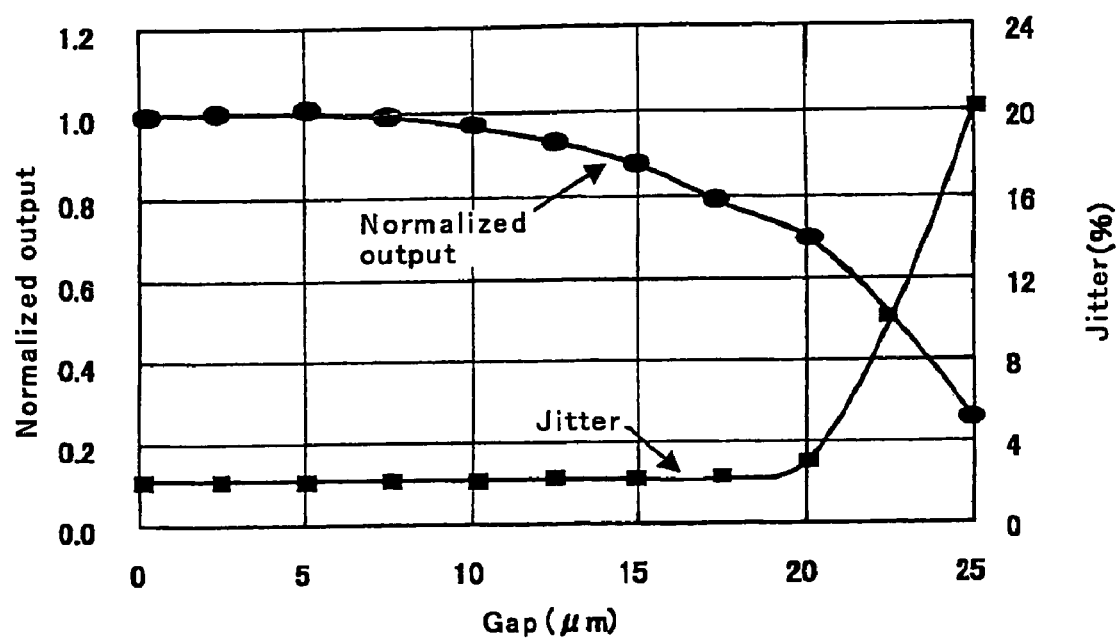
FIG. 7 is a graph showing a normalized output and a jitter with respect to a gap in the magnetic encoder according to the present invention.

FIG. 7 is a graph showing a magnetic sensor output voltage and a jitter with respect to a gap. A jitter and an output voltage of a magnetic sensor element with respect to a gap (μm) are determined with a spacer inserted between the magnetic sensor element and the magnetic medium. With the magnetic sensor element moving relative to the magnetic medium, the pitch angle and roll angle of the magnetic sensor element will vary, following the movement, and so does the gap. An output voltage of the magnetic sensor element is expressed in the form of a normalized output which is defined such that an output voltage being one is output with respect to a gap 0 μm. A jitter is a rate (%) of a difference between an output signal pitch and a magnetic pole pitch of a magnetic medium with respect to the magnetic pole pitch. As the gap becomes larger, strength of a magnetic field caused by the magnetic medium in the magnetic sensor element becomes smaller, and so does the output. The jitter remains unchanged with respect the gap up to a certain amount, but is sharply deteriorated with respect to the gap of an amount larger than the certain amount. During reciprocative sliding, slight variation of the gap results in slight variation of the output voltage. Variation of an output voltage does not affect the jitter as long as the output voltage is relatively large. However, variation of an output voltage remarkably affects the jitter once the output voltage becomes smaller. As shown in the graph of FIG. 7, the output gradually drops, while the jitter remains constant at about 2%, with respect to the gap between 0 μm and 20 μm. It is known from this result that tolerance for the gap which will vary due to variation of the pitch angle and roll angle of the magnetic sensor element is up to 20 μm.

Figure 8A:
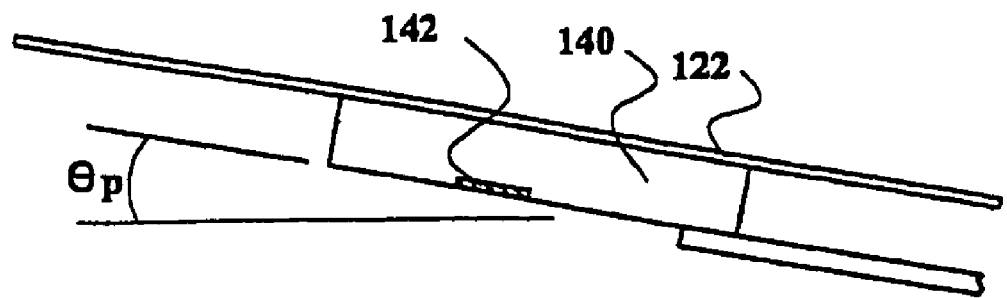
FIG. 8A and FIG. 8B are schematic side views explaining a pitch angle of the magnetic sensor element in the magnetic encoder according to the present invention.
Figure 8B:
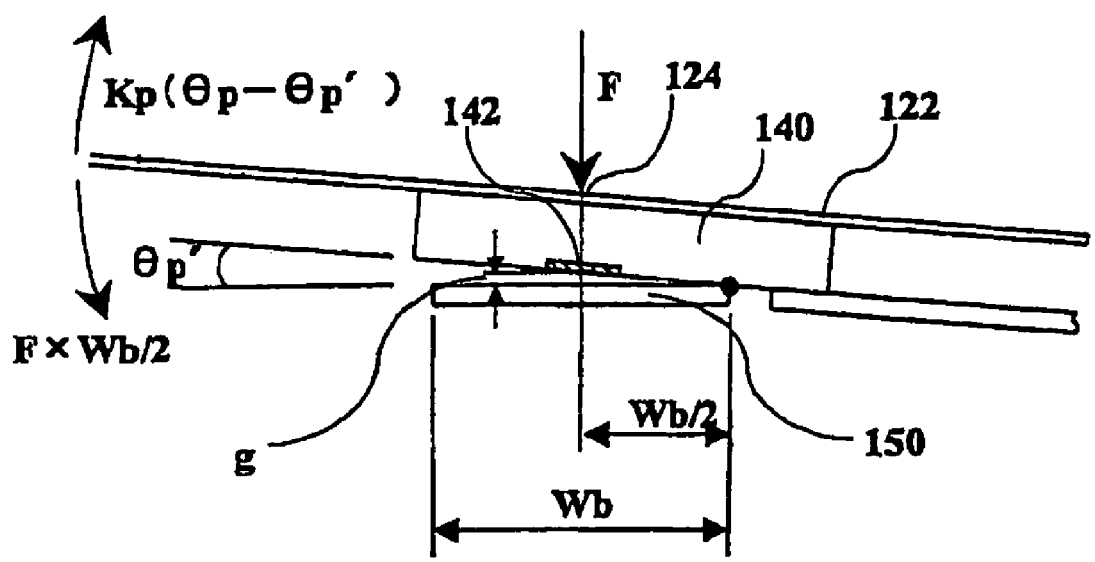

FIG. 8 is a side view of the magnetic sensor element 140 and the magnetic medium 150 viewed in the X axial direction, for explaining a relationship between the gap and the tilt (a pitch angle) of the magnetic sensor element 140 around the X axis. The magnetic sensor element 140 contacts the magnetic medium 150, and a load F is applied to the pressure point 124 at the substantial center of the sensor holding portion 122 of the magnetic sensor holding mechanism. The magnetic sensor element 140 is located opposed to the magnetic medium 150 so as to contact the entire width Wb of the magnetic medium 150. The pressure point 124 is located at the center of the magnetic medium 150 having the width Wb, the center being far from the side edge of the magnetic medium 150 by a distance Wb/2. The pitch elasticity of the magnetic sensor holding mechanism is defined as Kp, and the pitch angle of the magnetic sensor element 140 not in contact with the magnetic medium is defined as $\ominus p$, as shown in FIG. 8A. The magnetoresistive element 142 is provided on the lower surface of the magnetic sensor element 140. When the pitch angle resulted with the magnetic sensor element 140 being pressed onto the magnetic medium 150 with the load F is defined as $\ominus p'$, as shown in FIG. 8B, a moment due to the load F acting on the magnetic sensor element and a moment due to the pitch elasticity of the magnetic sensor holding mechanism can be expressed as below, respectively.

Moment due to load $F$: $F \times Wb/2$

Moment due to pitch elasticity: $Kp \times (\ominus p - \ominus p')$

As the moment due to the load F and the moment due to the pitch elasticity are balanced with the pitch angle $\ominus p'$, $F \times Wb/2 = Kp(\ominus p - \ominus p')$ is resulted.

When the moment due to the load F is larger than the maximum value $Kp \times \ominus p$ of the moment due to the pitch elasticity, the pitch angle $\ominus p'$ becomes 0 degree. Therefore, the pitch angle $\ominus p'$ is resulted as below:

For $Kp \times \ominus p <= F \times Wb/2$, $\ominus p' = 0$.

For $Kp \times \ominus p > F \times Wb/2$, $\ominus p' = \ominus p - F \times Wb/2/Kp$.

A gap g in the vicinity of the magnetoresistive element 142 in the above is expressed as $g = Wb/2 \times \tan(\ominus p')$.

Figure 9:
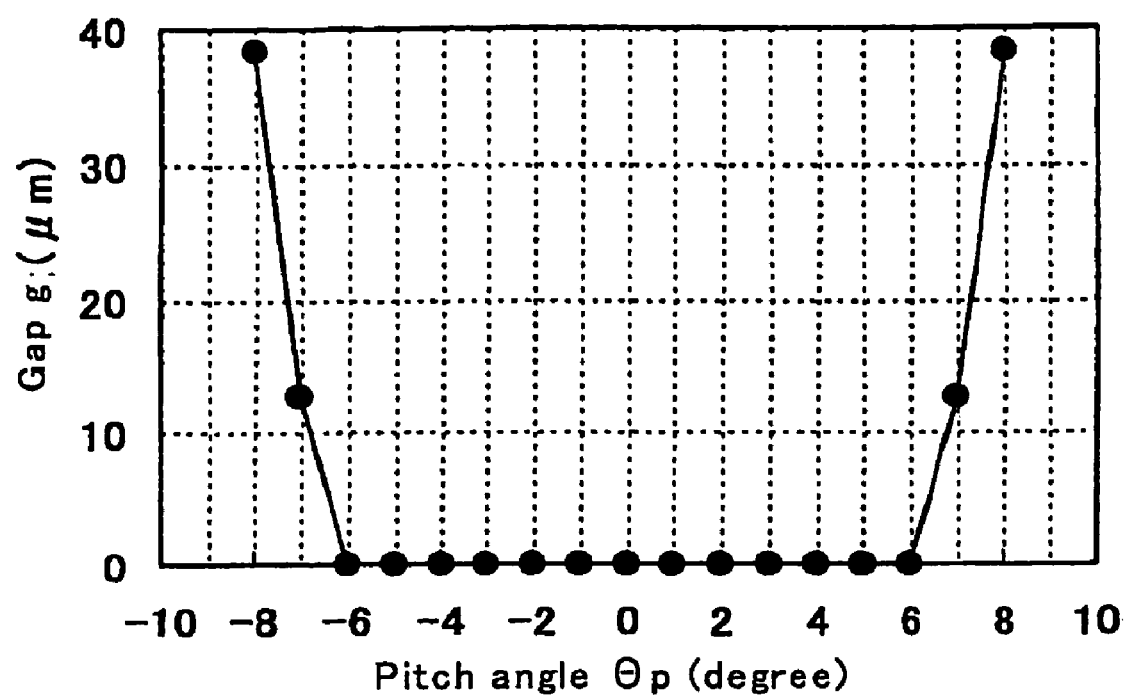
FIG. 9 is a graph showing a relationship between a gap g and a pitch angle $(-)p$ of the magnetic sensor element in the magnetic encoder according to the present invention.

FIG. 9 is a graph showing a relationship between the pitch angle $\ominus p$ and the gap. A load F imparted from the sensor holding portion is of 117 mN, and the pitch elasticity is of 26.8 mN·mm/degree. The width Wb of the magnetic medium is defined as 3 mm. According to the graph in FIG. 9, the gap for the pitch angle $\ominus p$ being 7 degrees is about 12 μm, that is, smaller than the gap tolerance, namely 20 μm. That is, it is known from FIG. 7 that such a gap does not affect the jitter. Factors causing pitch angle variation include variation in parallelness between the flat surface of the fixing portion of the leaf spring and that of the sensor holding portion, variation in parallelness between the magnetic sensor element and the sensor holding portion, variation in space between the contact position and lower edge of the sensor element 140 caused when the magnetic sensor holding mechanism is mounted on the mounting pedestal of the magnetic sensor, and variation of the pitch angle when the magnetic sensor reciprocatively slides on the magnetic medium.

In the magnetic encoder 100b according to the second embodiment, measurement shows that variation in parallelness between the fixing portion 126b and the sensor holding portion 122 of the magnetic sensor holding mechanism 120b is ±0.5 degrees, and variation between the magnetic sensor element 140 and the sensor holding portion 122 is ±1.0 degree. With estimation that variation of the pitch angle due to an error in parallelness between the fixing portion 126b and the mounting pedestal 160 of the magnetic sensor holding mechanism 120b is ±1.0 degree and variation of the pitch angle when sliding is ±1.0 degree, possible variation of the pitch angle $\ominus p$ is ±3.5 degrees. Although the maximum gap variation due to pitch angle variation is calculated to be about 92 μm, the gap variation can be absorbed through elastic deformation of the elastic arm, so that gap variation can be substantially eliminated.

In the following, influence of the roll angle and an X offset on the gap will be described. FIG. 10 is a side view of the magnetic sensor element 140 and the magnetic medium 150 viewed in the Y axial direction. Displacement of the center of the magnetic sensor element (also the center of the magnetoresistive element 20) in the X axial direction from the position where the magnetic medium contacts the magnetic sensor element (referred to as an "X offset"), tilt (a roll angle) of the magnetic sensor element around the Y axis, a moment due to the load F acting on the magnetic sensor element, a moment due to friction, and a moment due to roll elasticity of the magnetic sensor holding mechanism will be described.

Figure 10A:
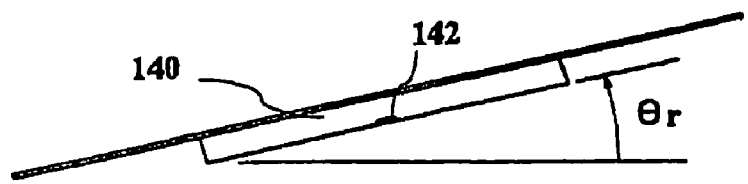
FIG. 10A and FIG. 10B are schematic side views explaining a roll angle of the magnetic sensor element in the magnetic encoder according to the present invention.

The magnetic sensor element 140 contacts the magnetic medium 150; the magnetic sensor element 140 is subjected to an X offset by an amount Xo; and the magnetic sensor element 140 is pressed with a load F at a pressure point 124 displaced by the amount Xo from the magnetic medium center. The magnetic medium 150 rotates clockwise with a kinetic friction factor μ of friction between the magnetic sensor element 140 and the magnetic medium 150. As shown in FIG. 10A, the roll angle of the magnetic sensor element 140 not in contact with the magnetic medium is defined as $\ominus r$; the roll angle with the magnetic sensor element 140 shown in FIG. 10B being pressed onto the magnetic medium 150 with the load F and the X offset Xo caused due to rotation of the magnetic medium is defined as $\ominus r'$. The roll elasticity of the magnetic sensor holding mechanism is defined as Kr; the curvature radius of the magnetic medium 150 is defined as r; the thickness of the magnetic sensor element 140 is defined as h'; and the panel thickness of the sensor holding portion 122 is defined as hb. The following expressions are held as to a moment due to the load F, a moment due to friction, a moment due to roll elasticity of the magnetic sensor holding mechanism, and the roll angle $\ominus r'$.

Figure 10B:
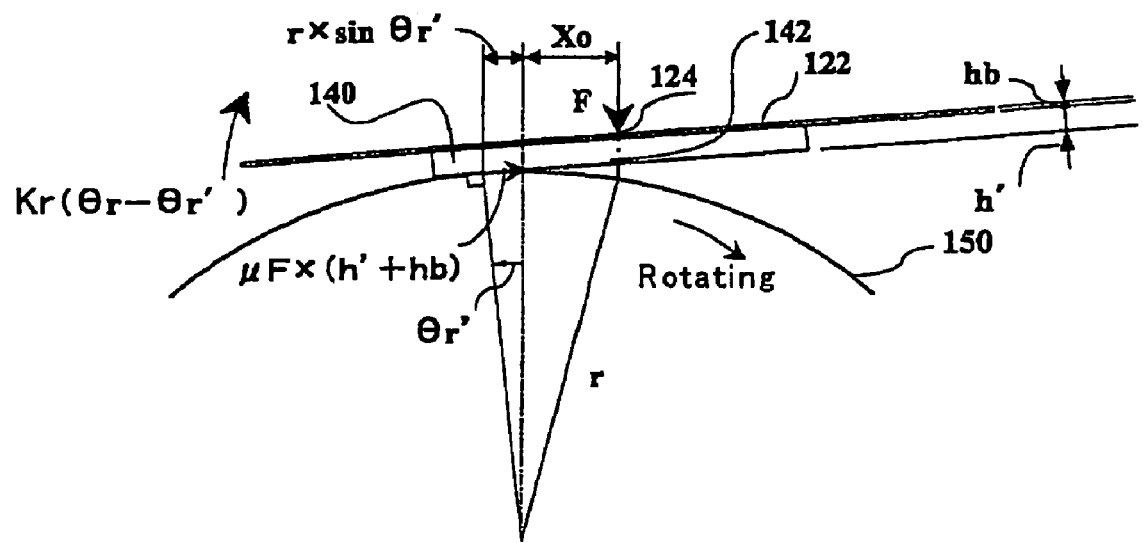
Figure 11:
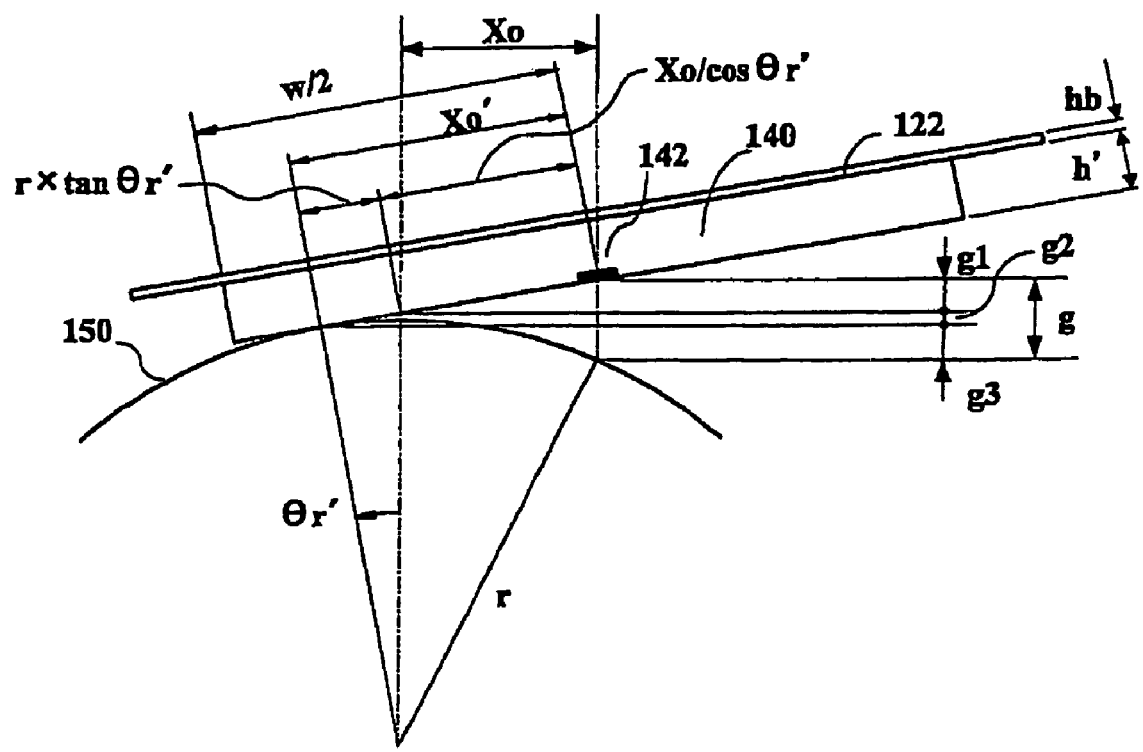
FIG. 11 is a schematic side view showing FIG. 10B in detail.

$F \times [Xo + r \times \sin(\ominus r')] = \mu \times F \times (h' + hb) + Kr \times (\ominus r - \ominus r')$ moment due to the load $F$: $F \times [Xo + r \times \sin(\ominus r')]$ moment due to friction: $\mu \times F \times (h' + hb)$ moment due to elasticity of the leaf spring in the rolling direction: $Kr \times (\ominus r - \ominus r')$ FIG. 11, or revision of FIG. 10B, shows a relationship, with respect to the roll angle being $\ominus r'$, between the gap g and the distance Xo' from the middle of the width w of the magnetic sensor element 140 to the position where the magnetic sensor element 140 contacts the magnetic medium 150. Note that in actuality, the center of roll rotation of the magnetic sensor element is the pressure point 124. However, as regarding the center of the magnetoresistive element 142 as the center of rotation barely affects a calculation result of the gap, and moreover, can simplify the calculation expression, the following description is made, based on the assumption that the magnetoresistive element 142 tilts, using the center thereof as an axis. The gap g can be obtained as a sum of the height g1 from the surface of the magnetoresistive element 142 to the element surface on the central line with no X offset, the height g2 from the element surface on the central line to the contact position, and the height g3 from the contact position to the surface of the magnetic medium 150 subjected to an X offset from the contact position by an amount Xo. The calculation expressions are as follows:

$$g1 = Xo \times \tan(\ominus)r'$$

$$g2 = r \times \tan(\ominus)r' \times \sin(\ominus)r'$$

$$g3 = r \times \cos(\ominus)r' - (r^2 - Xo^2)^{1/2}$$

$$g = Xo \times \tan(\ominus)r' + r \times \tan(\ominus)r' \times \sin(\ominus)'r + r \times \cos(\ominus)r' - (r^2 - Xo^2)^{1/2}$$

With the distance from the middle of the width W of the magnetic sensor element 140 to the position where the magnetic sensor element 140 contacts the magnetic medium 150 is defined as Xo', the distance Xo' can be obtained as follows:

$$Xo' = r \times \tan(\ominus)r') + Xo/\cos(\ominus)r')$$

Figure 12A:
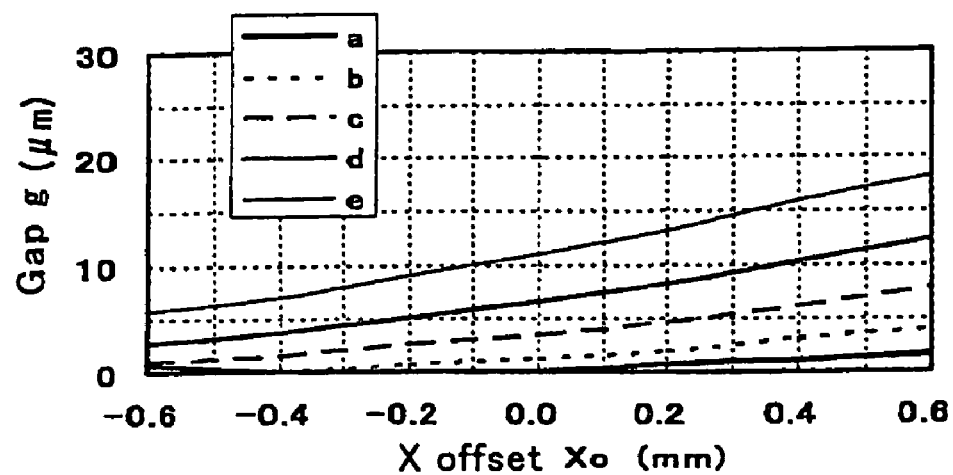
FIGS. 12A and 12B are graphs showing a gap g with respect to an X offset Xo of the magnetic sensor element in the magnetic encoder according to the present invention, and a distance Xo' to a contact point with respect to the same.
Figure 12B:
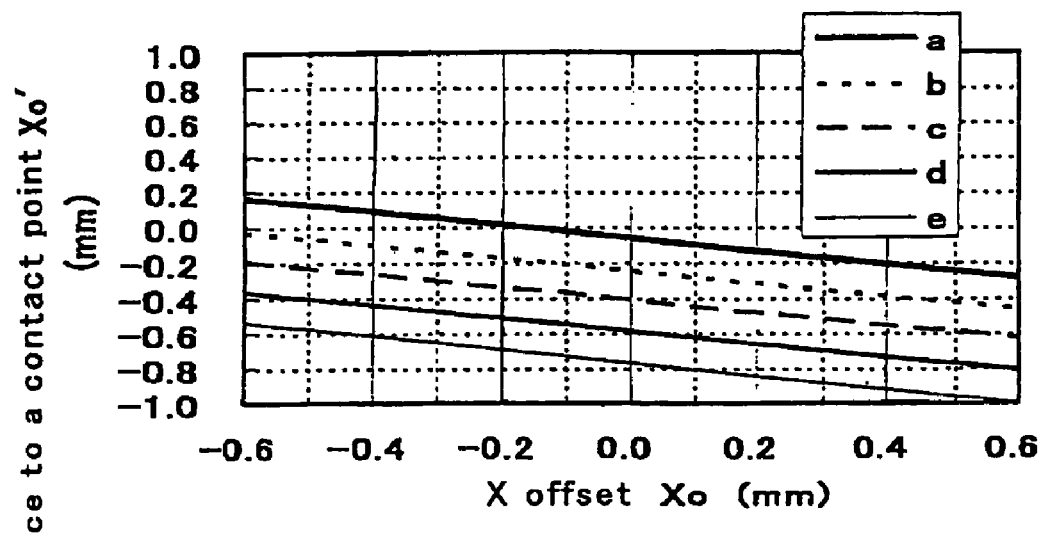

FIG. 12A is a graph showing a gap g (μm) with respect to the X offset Xo being changed from −0.6 mm to +0.6 mm in the respective magnetic encoders a, b, c, d with the roll angles (-)r being 0, −1, −2, −3, and −4 degrees, respectively; FIG. 12B is a graph showing distance to a contact point Xo'(mm) from the center of the width w of magnetic sensor element 140 in the same magnetic encoders. Note that, in the above, the load F is set to 117 mN; the roll elasticity Kr is set to 32.38 mN·mm/degree; the thickness h' of the magnetic sensor element is set to 1.1 mm; and the width w is set to 2 mm. The magnetic sensor element 140 is a flat panel having thickness h' being 1.1 mm and width w being 2 mm, which is a size which can facilitate mounting of the magnetic sensor element 140 on the sensor holding portion 122 of the magnetic sensor holding mechanism. The kinetic friction factor μ is 0.1.

As is obvious from FIG. 12A, also in the magnetic encoder e with the roll angle (-)r being −4 degrees, the gap being about 16.6 μm is resulted, which is within the tolerance defined as 20 μm or smaller, even when the X offset is as large as 0.5 mm. Measurement of roll angle variation for every factor shows that roll angle variation due to variation in parallelness between the fixing portion 126b and the sensor holding portion 122 of the magnetic sensor holding mechanism is ±0.5 degrees and that due to variation in parallelness between the magnetic sensor element 140 and the sensor holding portion 122 is ±1.0 degree. With estimation that roll angle variation due to variation in parallelness in mounting the magnetic sensor holding mechanism 120b on the mounting pedestal 160 is ±1.0 degree and that when the magnetic sensor element 140 and the magnetic medium 150 reciprocatively slide is ±1.0 degree, possible roll angle variation (-)r will be ±3.5 degrees. That is, gap variation is scarcely caused.

Meanwhile, the X offset, which occurs mainly when mounting the magnetic sensor holding mechanism 120b on the mounting pedestal 160, can be reduced to ±0.5 mm, when using a suitable jig. As described above, variation of the pitch angle and the roll angle and variation of the gap due to that variation remain within a tolerant range even when the magnetic sensor element and the magnetic medium reciprocatively slide in the magnetic encoder according to this embodiment of the present invention. That is, it can be verified that a magnetic encoder can sufficiently obtain required characteristic.

When the distance Xo' from the middle of the width of the magnetic sensor element 140 to the point where the magnetic sensor element 140 contacts the magnetic medium 150 is equal to or shorter than a half of the magnetic sensor element width w, the side edge 146 of the magnetic sensor element 140 does not contact the magnetic medium 150. That is, preferable sliding nature can be obtained even though the side edge 146 of the magnetic sensor element does not constitute a curved surface. In FIG. 12B, in the magnetic encoder e with the roll angle (-)r being −4 degrees, even with respect to the X offset being 0.5 mm, the distance Xo' between the middle of the width w of the magnetic sensor element 140 and the point where the magnetic sensor element 140 contacts the magnetic medium 150 is about −0.96 mm, that is, a distance not exceeding a half of the width w of the magnetic sensor element 140, namely, 1.0 mm. Therefore, even though a magnetic sensor element is used in the state of having been just cut off from a wafer, using a diamond grinder, and variation then exists in the X offset and the roll angle, preferable sliding nature can be obtained as the side edge of the magnetic sensor element does not contact the magnetic medium.

Fourth Embodiment

Figure 13A:
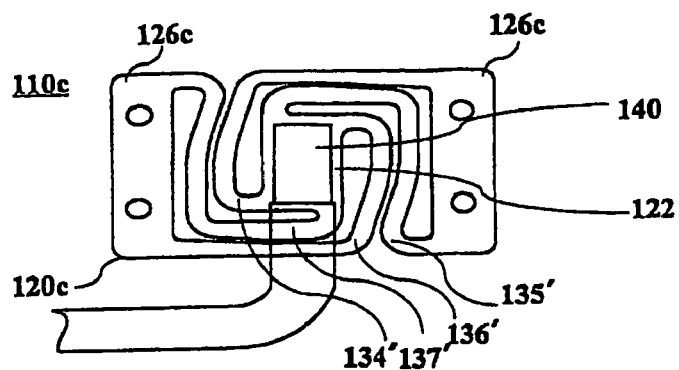
FIG. 13 is a diagram showing a magnetic sensor used in the magnetic encoder according to a fourth embodiment of the present invention, with FIG. 13A being a plan view of the same and FIGS. 13B, 13C, and 13D being side views of the same.
Figure 13B:
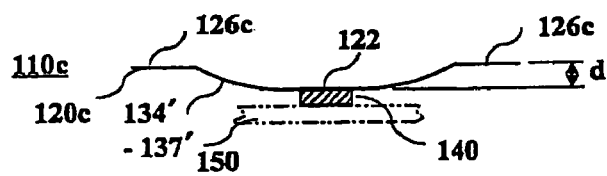
Figure 13C:
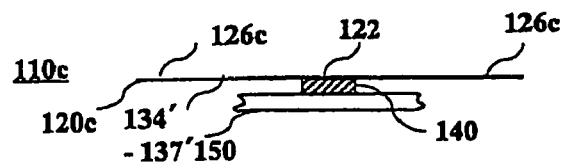

As the magnetic encoder 100c in the fourth embodiment is substantially identical to that in the second embodiment, the exploded perspective view in FIG. 3 is referred to here. FIG. 13 is a plan view and a side view of the magnetic sensor 110c shown in FIG. 3. FIG. 13A is a plan view of the magnetic sensor 110c viewed from the magnetic medium side; FIGS. 13B and 13C are side views of the same. The magnetic sensor holding mechanism 120c comprises a sensor holding portion 122 for holding the magnetic sensor element 140, four elastic arms 134', 135', 136', 137', and two fixing portions 126c. The elastic arms 134' to 137' extend from the respective end portions of the opposed side edges of the two fixing portions 126c and be connected to the sensor holding portion 122. FIG. 13B is a side view showing the magnetic sensor element 140 not in contact with the magnetic medium 150 with a difference d in height between the flat surface of the sensor holding portion 122 of the magnetic sensor holding mechanism 120c and that of the two fixing portions 126c. That is, the elastic arms 134' to 137' are bent in advance so as to constitute a convex surface with the sensor holding portion 122 as a vertex surface. With the magnetic sensor element 140 being pressed onto the magnetic medium 150, the elastic arms 134' to 137' come to bend less. As a result, the difference d in height between the flat surface of the second holding unit 122 and that of the two fixing portions 126c becomes smaller. FIG. 13C is a cross sectional view of the magnetic sensor 110c with the height difference d being 0 as a result of pressing the magnetic sensor element 140 onto the magnetic medium 150 until the sensor holding portion 122, the elastic arms 134' to 137', and the fixing portion 126c come to be on the same flat surface. Spring characteristic of the elastic arms 134' to 137' of the magnetic sensor holding mechanism 120c is such that pitch elasticity is 26.8 mN·mm/degree, roll elasticity is 32.2 mN·mm/degree, spring elasticity in the Z axial direction is 137.2 mN/mm, and a load is 110 mN when the magnetic sensor element 140 is pressed onto the magnetic medium 150 until the elastic arms 134' to 137' become flat, in the magnetic sensor 110c with the height difference d being 0.8 mm, as shown in FIG. 13C.

Figure 13D:
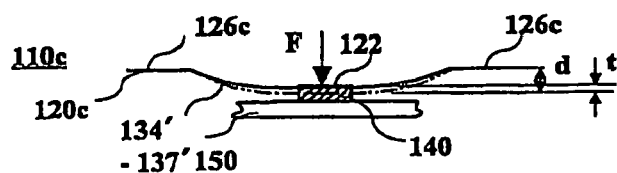
Figure 14:
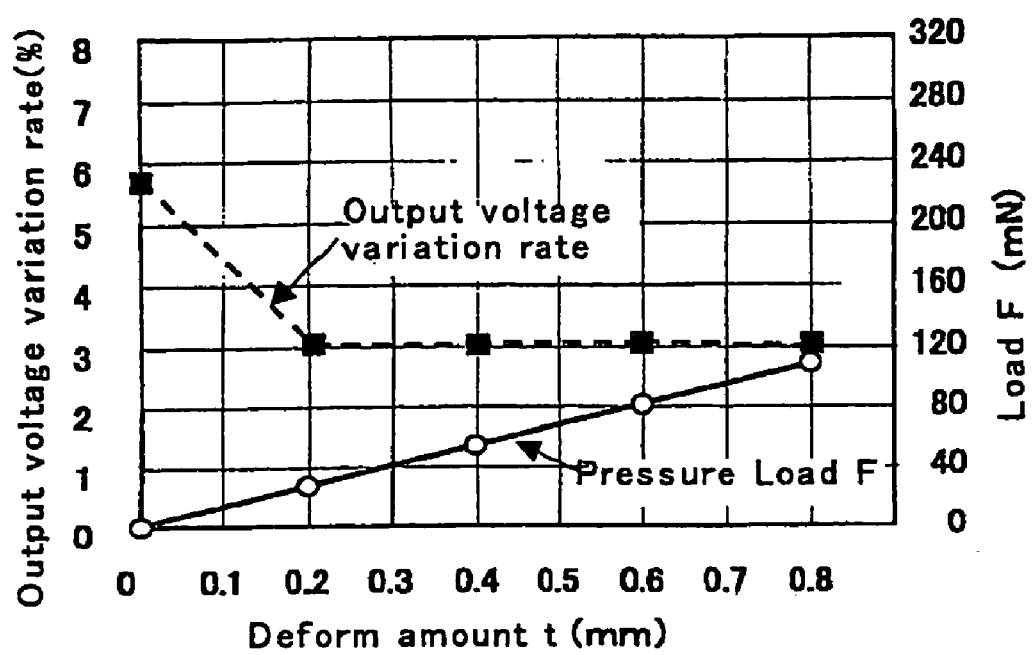
FIG. 14 is a graph showing an output voltage variation rate (%) and a load F with respect to a deform amount t of the magnetic sensor holding mechanism in the magnetic encoder according to the fourth embodiment of the present invention.
Figure 15A:
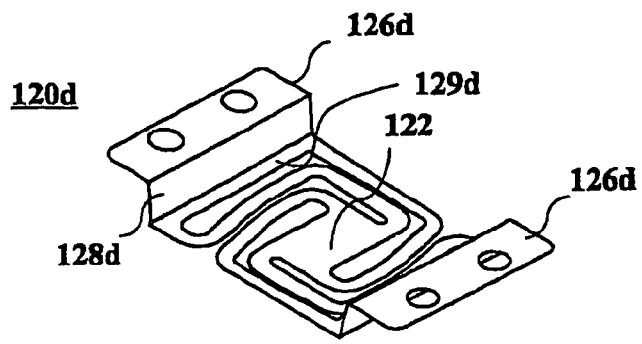
FIGS. 15A, 15B, 15C, and 15D are perspective views of other embodiments of the magnetic sensor holding mechanism usable in the magnetic encoder according to the present invention.
Figure 15B:
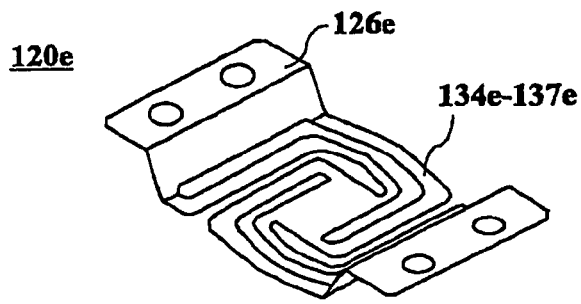
Figure 15C:
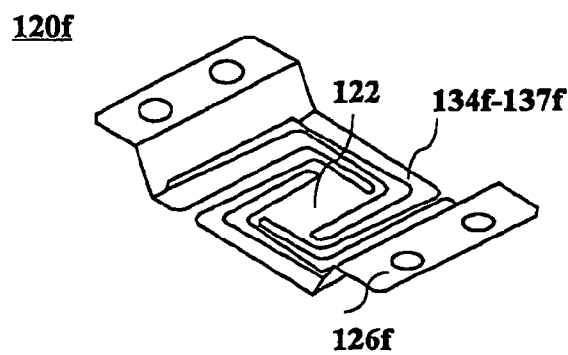
Figure 15D:
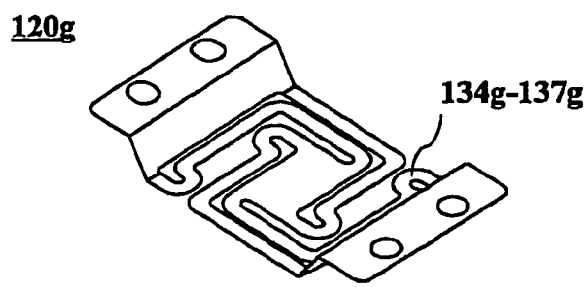

The elastic arms 134' to 137' are bent in advance so that a height difference d being 0.8 mm is resulted between the flat surface of the sensor holding portion 122 and the flat surface of the two fixing portions 126c with the magnetic sensor element 140 not in contact with the magnetic medium 150. A load F when the magnetic sensor element 140 is pressed onto the magnetic medium 150 to thereby reduce the extent by which the elastic arms 134' to 137' is bent until the height difference d between the flat surface of the sensor holding portion 122 and the flat surface where the two fixing portions 126c are provided is reduced by the deform amount t, as shown in FIG. 13D, and an output voltage variation rate (%) of the magnetic sensor element when the magnetic sensor element 140 in the above described state reciprocatively slides relative to the magnetic medium 150 are obtained. FIG. 14 shows the load F and the output voltage variation rate (%) with respect to the deform amount t, in which the deform amount t with the magnetic sensor element 140 in contact with the magnetic medium 150 is defined zero. The deform amount t can be vary between 0 mm to 0.8 mm, which is equal to the height difference d. The output voltage variation rate (%) is defined as a rate of the difference between the maximum and minimum output voltages when the magnetic sensor element 140 reciprocatively moves from one to the other end of the length of the magnetic medium on the magnetic medium 150, with respect to the average of the output voltages. The load F is of 30 mN or smaller with respect to the deform amount t between 0 mm and 0.2 mm. This load F is insufficient to stabilize the gap between the magnetic sensor element and the magnetic medium, and a larger output voltage variation rate (%) is accordingly resulted. This hinders the magnetic encoder from achieving accurate detection of displacement. With the deform amount t being 0.2 mm or larger, a lower output voltage variation rate (%) is resulted. However, while taking allowance into consideration, a deform amount t being 0.4 mm or larger (a load being 50 mN or larger) is preferred. As the graph in FIG. 14 coincides with the graph in FIG. 5 concerning the magnetic encoder 100b according to the second embodiment in the range with the deform amount t between 0 to 0.8 mm, it is determined that the magnetic encoder 100c according to the fourth embodiment has identical deform amount t-load F characteristic to that of the second embodiment, and that the magnetic encoder 100c can be used similar to the magnetic encoders 100a, 100b in the first and second embodiments.

Fifth Embodiment

FIG. 15 is a perspective view showing other embodiments of a magnetic sensor holding mechanism usable in a magnetic encoder according to the present invention. The respective embodiments shown in FIG. 15 differ from the magnetic sensor holding mechanism 120a in the first embodiment shown in FIG. 1 in structure for mounting the elastic arm on the fixing portion. In the magnetic sensor holding mechanism 120d shown in FIG. 15A, a part 129d of the side wall 128d of the fixing portion 126d is formed on the substantially same surface of the sensor holding portion 122. The magnetic sensor holding mechanism 120e shown in FIG. 15B differs from that shown in FIG. 1 in shape of the elastic arm, in which, while a part of the elastic arms 134e to 137e, perpendicular to the moving direction of the magnetic medium is of a straight line, a part of the same in parallel to the moving direction of the magnetic medium swells outward in a substantial middle portion thereof so that the swelled vertex is located outside the end portion of the fixing portion 126e. The magnetic sensor holding mechanism 120f in FIG. 15C has elastic arms 134f to 137f of which width becomes thinner as it goes from the fixing portion 126f toward the sensor holding portion 122. The magnetic sensor holding mechanism 120g shown in FIG. 15D has elastic arms 134g to 137g a part of which is curved to thereby elongate the elastic arms 134g to 137g. Any of the magnetic sensor holding mechanisms shown here can obtain desired characteristic as that in the first embodiment, with detailed size not specified.

Six Embodiment

Figure 16A:
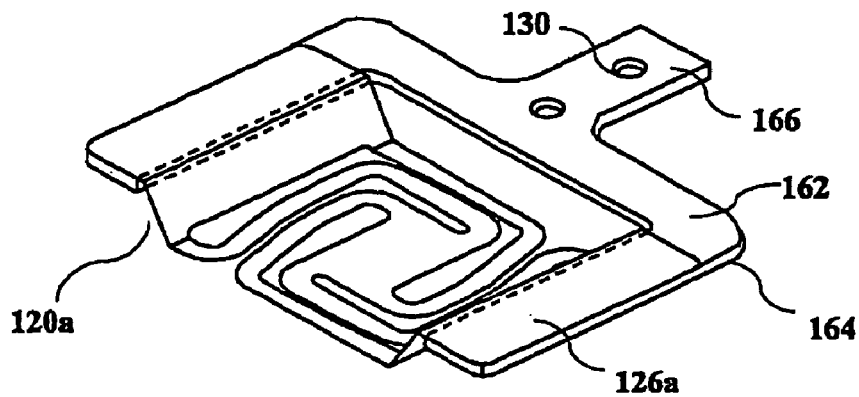
FIGS. 16A, 16B, and 16C are perspective views of other embodiments of the magnetic sensor holding mechanism each having a fixing portion holding mechanism usable in the magnetic encoder according to the present invention.
Figure 16B:
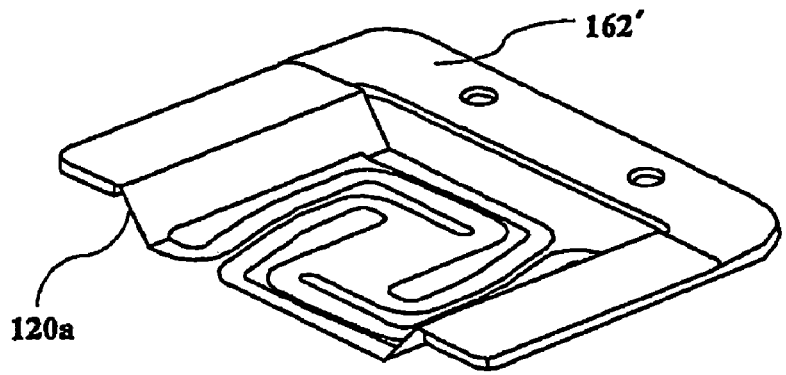
Figure 16C:
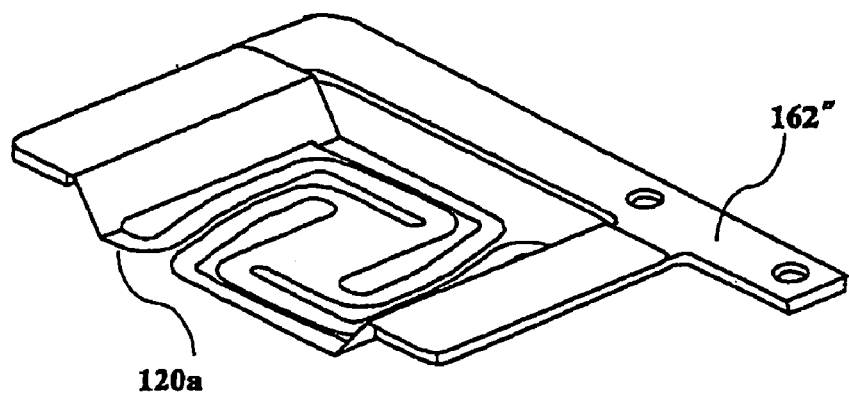
Figure 17A:
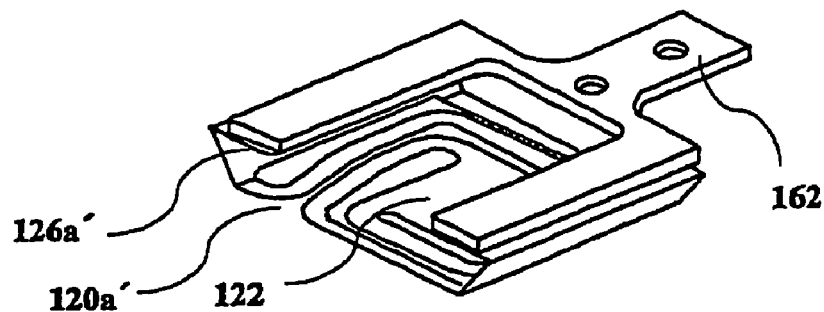
FIGS. 17A, 17B, and 17C are perspective views of still other embodiments of the magnetic sensor holding mechanism each having a fixing portion holding mechanism usable in the magnetic encoder according to the present invention.
Figure 17B:
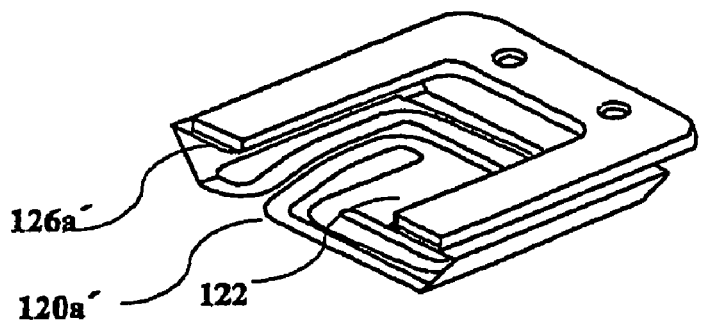
Figure 17C:
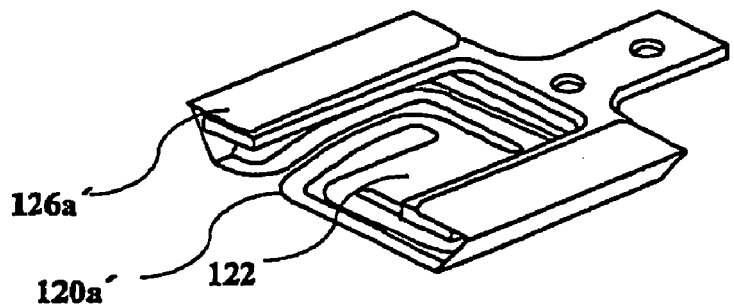
Figure 18A:
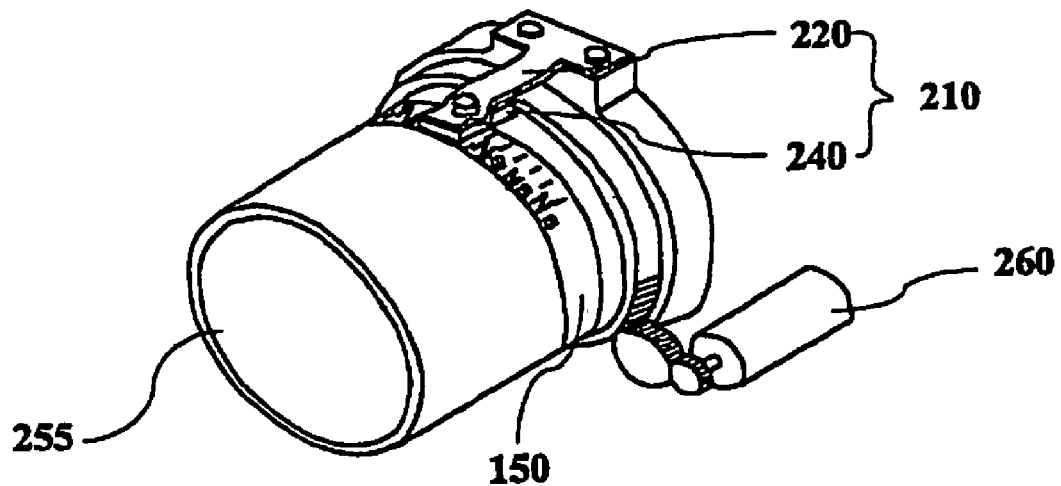
FIG. 18A is a perspective view of a lens barrel for a conventional auto-focus camera and a magnetic sensor mounted thereon and FIG. 18B is a cross sectional view of the same.
Figure 18B:
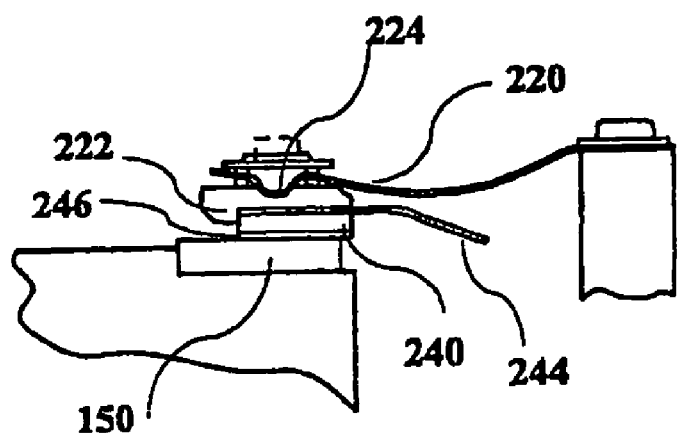
Figure 19A:
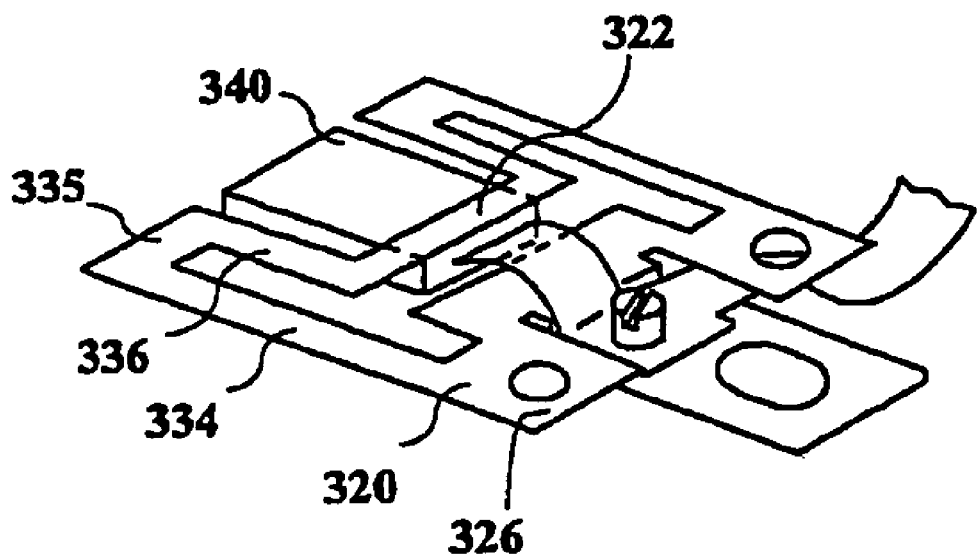
FIG. 19A is a perspective view of a conventional magnetic sensor which reduces pitch angle variation.
Figure 19B:
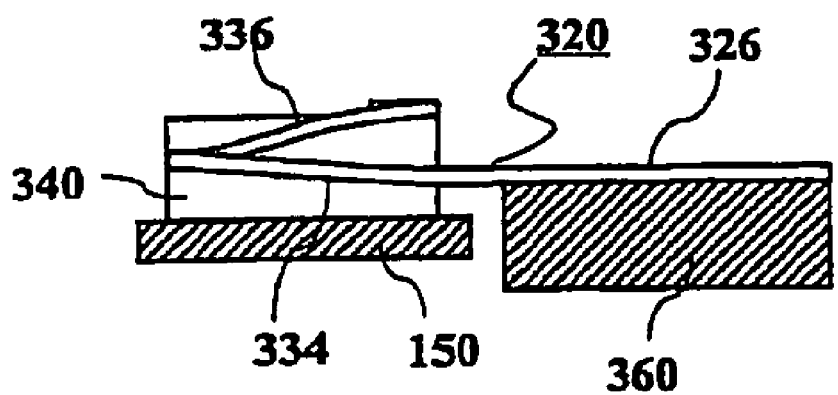
FIG. 19B is a cross sectional view of the same.
Figure 20A:
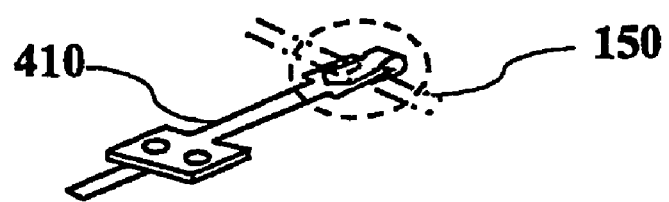
FIGS. 20A, 20B, and 20C are perspective views of a conventional magnetic sensor which reduces displacement in position in the sliding direction.
Figure 20B:
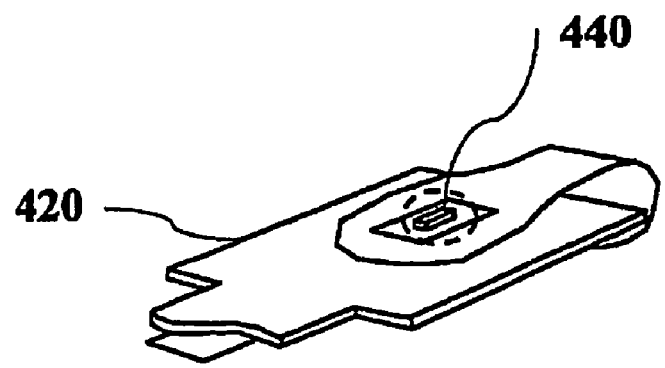
Figure 20C:
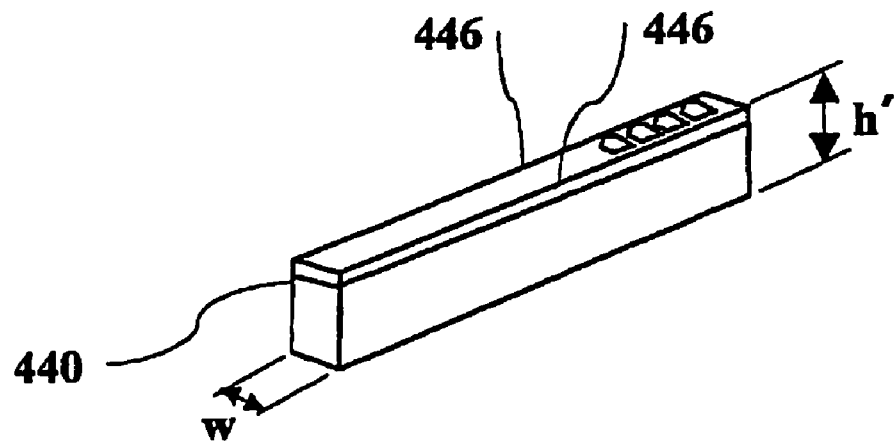
Figure 21A:
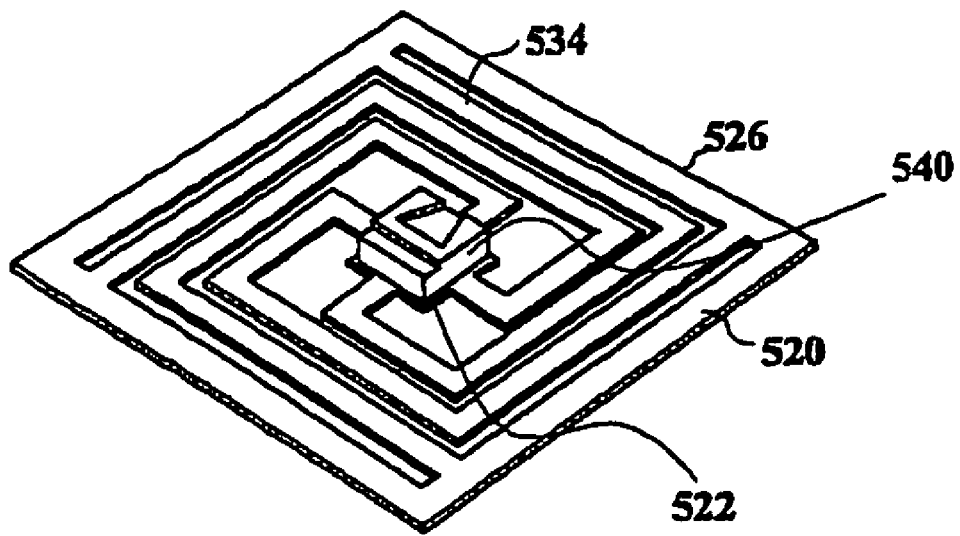
FIG. 21A is a perspective view of a conventional floating magnetic head having a single leaf spring having a pressuring function and a gimbal spring function.
Figure 21B:
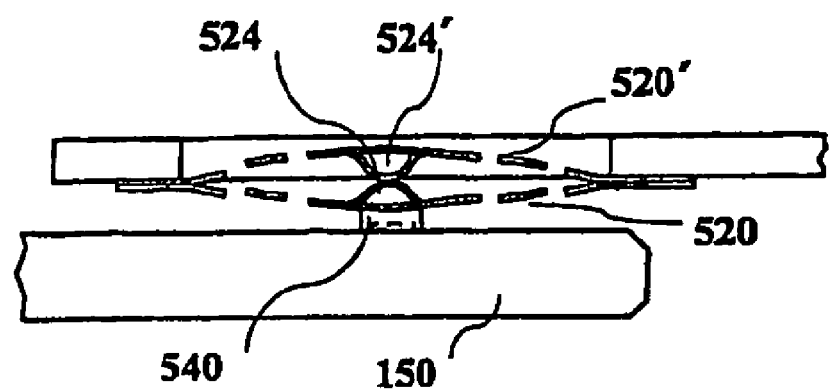
FIG. 21B is a cross sectional view of the same.

FIG. 16 is a perspective view of a magnetic sensor holding mechanism having a fixing portion holding member which is usable in a magnetic encoder according to the present invention. Here, the magnetic sensor holding mechanism 120a shown in FIG. 1 is used. Using two substantially U-shaped arms 164 of the fixing portion holding member 162, the fixing portion 126a of the magnetic sensor holding mechanism 120a is supported. The fixing portions 126a are connected to the arms 164 by means of laser welding. The grip 166 of the fixing portion holding member 162, shown in FIG. 16A, is formed in parallel to the arm 164. Two holes 130 are formed on the grip 166 for fixing the magnetic sensor holding mechanism 120a on a mounting portion. In this embodiment, as a screw is not used to fix the thin panel fixing portion 126a, well trained screwing skill is not required, and moreover, a magnetic sensor can be readily handled. FIGS. 16B and 16C show magnetic sensor holding mechanisms having the grip (the parts having two holds) 166 formed in a different position from that in FIG. 16A. The fixing portion holding member 162' in FIG. 16B is substantially U-shaped; the fixing portion holding member 162" in FIG. 16C is substantially F-shaped. In FIG. 17A to FIG. 17C, the fixing portion 126a' of the magnetic sensor holding mechanism 120a' is bent backward toward the sensor holding portion 122. With the fixing portion 126a' bent backward toward the sensor holding portion 122, the magnetic sensor holding mechanism 120a' can be formed smaller in size. Different structures for mounting the fixing portion holding member 162 are employed in FIG. 17A to FIG. 17C, respectively.

It should be noted although modified examples of the magnetic sensor holding mechanism of the magnetic encoder 100a according to the first embodiment are described in the fifth and sixth embodiments, the magnetic encoders 100b, 100c according to the second and fourth embodiments can be modified in the similar manner.

What is claimed is:
1. A magnetic encoder comprising a magnetic medium having a certain curvature and a magnetic sensor, in which the magnetic sensor has a magnetic sensor element and a magnetic sensor holding mechanism for elastically holding the magnetic sensor element so as to oppose to the magnetic medium, the magnetic sensor element having a magnetoresistive element for detecting a magnetic field caused from the magnetic medium and capable of reciprocatively sliding relative to the magnetic medium,
wherein
the magnetic sensor holding mechanism includes
two fixing portions provided on each side of the magnetic sensor holding mechanism so as to be located in a single flat surface,
a rectangular sensor holding portion located on a flat surface in parallel to the flat surface where the two fixing portions are provided, for holding the-magnetic sensor element so as to oppose to the magnetic medium, and elastic arms each extending from an area in the vicinity of a vertex of the rectangular sensor holding portion so as to surround about a half of the periphery of the sensor holding portion and to be connected to a respective end portion of the respective fixing portion to thereby connect therebetween, and the elastic arm of the magnetic sensor holding mechanism imparts a torsion elasticity acting around an axis in the direction in which the magnetic medium reciprocatively slides, a torsion elasticity acting around an axis in the direction perpendicular to the direction in which the magnetic medium reciprocatively slides and in parallel to the surface of the magnetic medium, and an elastic force in the direction perpendicular to the surface of the magnetic medium, to the magnetic sensor element on the sensor holding portion toward the magnetic medium.

2. The magnetic encoder according to claim 1, wherein the magnetoresistive element is located at substantially middle of the sensor holding portion of the magnetic sensor holding mechanism.

3. The magnetic encoder according to claim 2, wherein the fixing portion, the sensor holding portion, and the elastic arm of the magnetic sensor holding mechanism are integrally made of a single spring plate.

4. The magnetic encoder according to claim 3, wherein the spring plate is 50 μm thick to 200 μm thick.

5. The magnetic encoder according to claim 3, wherein material of the spring plate is non-magnetic and either stainless steel or any bronze alloy of phosphor bronze, nickel silver, and brass.

6. The magnetic encoder according to claim 3, wherein the elastic force of the elastic arm of the magnetic sensor holding mechanism, the force acting in the direction perpendicular to the surface of the magnetic medium, has a pressure load of 50 mN to 800 mN toward the magnetic medium.

7. The magnetic encoder according to claim 3, wherein the sensor holding portion and the elastic arm of the magnetic sensor holding mechanism are located on the same flat surface with the magnetic sensor element not in contact with the magnetic medium, and there is a difference in height between the flat surface of the sensor holding portion and the flat surface where the two fixing portions are located.

8. The magnetic encoder according to claim 3, wherein the fixing portion and the sensor holding portion of the magnetic sensor holding mechanism are located on the same flat surface with the magnetic sensor element not in contact with the magnetic medium.

9. The magnetic encoder according to claim 3, wherein there is a difference in height between the flat surface of the sensor holding portion of the magnetic sensor holding mechanism and the flat surface where the two fixing portions are located with the magnetic sensor element not in contact with the magnetic medium, and the difference in height becomes smaller when the magnetic sensor element contacts the magnetic medium.

10. The magnetic encoder according to claim 3, wherein the width of each of the elastic arms continuously changes from the area in the vicinity of each vertex of the sensor holding portion toward the respective end portion of the respective fixing portion.

* * * * *